United States Patent
Sakata et al.

(10) Patent No.: US 9,843,200 B2
(45) Date of Patent: Dec. 12, 2017

(54) POWER TRANSMISSION DEVICE AND WIRELESS POWER TRANSMISSION SYSTEM

(71) Applicant: Panasonic Intellectual Property Management Co., Ltd., Osaka (JP)

(72) Inventors: Tsutomu Sakata, Osaka (JP); Hiroshi Yamamoto, Osaka (JP); Hiroshi Kanno, Osaka (JP); Kenichi Asanuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 14/719,324

(22) Filed: May 22, 2015

(65) Prior Publication Data
US 2015/0349543 A1  Dec. 3, 2015

(30) Foreign Application Priority Data

May 27, 2014  (JP) .................................. 2014-108818
Feb. 25, 2015  (JP) .................................. 2015-035126

(51) Int. Cl.
*H02J 5/00* (2016.01)
*H02J 50/12* (2016.01)
(Continued)

(52) U.S. Cl.
CPC .............. *H02J 5/005* (2013.01); *H02J 7/025* (2013.01); *H02J 50/12* (2016.02); *H02J 50/60* (2016.02)

(58) Field of Classification Search
None
See application file for complete search history.

(56) References Cited

U.S. PATENT DOCUMENTS

| 2008/0200119 A1 | 8/2008 | Onishi et al. |
| 2013/0027078 A1* | 1/2013 | Nakano ................ H04B 5/0037 324/764.01 |
| 2015/0162752 A1 | 6/2015 | Endo |

FOREIGN PATENT DOCUMENTS

| CN | 102904348 A | 1/2013 |
| CN | 103368276 A | 10/2013 |
(Continued)

OTHER PUBLICATIONS

The Extended European Search Report dated Oct. 16, 2015 for European Patent Application No. 15169159.9.
(Continued)

*Primary Examiner* — Thienvu Tran
*Assistant Examiner* — David M Stables
(74) *Attorney, Agent, or Firm* — Greenblum & Bernstein, P.L.C.

(57) ABSTRACT

A power transmission device includes an inverter, an oscillator, a foreign substance detector, and a power transmission control circuitry. The power transmission control circuitry causes the foreign substance detector to perform a series of multiple processes and determine whether a foreign substance is present before a transmission of first AC power starts, and then causes the inverter to start the transmission of the first AC power. After the transmission starts, a detection period in which foreign substance detecting is performed and a power transmission period in which transmission of the first AC power is performed are repeated. The series of multiple processes is divided and performed in the multiple repeated detecting periods. The foreign substance detector is caused to divide and perform the series of multiple processes using the detecting periods and determine whether a foreign substance is present.

5 Claims, 30 Drawing Sheets

(51) Int. Cl.
    *H02J 50/60*         (2016.01)
    *H02J 7/02*          (2016.01)

(56) References Cited

FOREIGN PATENT DOCUMENTS

| | | | | |
|---|---|---|---|---|
| DE | 102012205693 | 10/2013 | | |
| EP | 2552030 | 1/2013 | | |
| GB | 2501609 | 10/2013 | | |
| GB | 2501609 A | * 10/2013 | ............. | H02J 17/00 |
| JP | 2009-033782 | 2/2009 | | |
| WO | 2013/179394 | 12/2013 | | |

OTHER PUBLICATIONS

English Translation of Chinese Search Report dated Apr. 27, 2017 for Chinese Patent Application No. 201510252973.9.

* cited by examiner

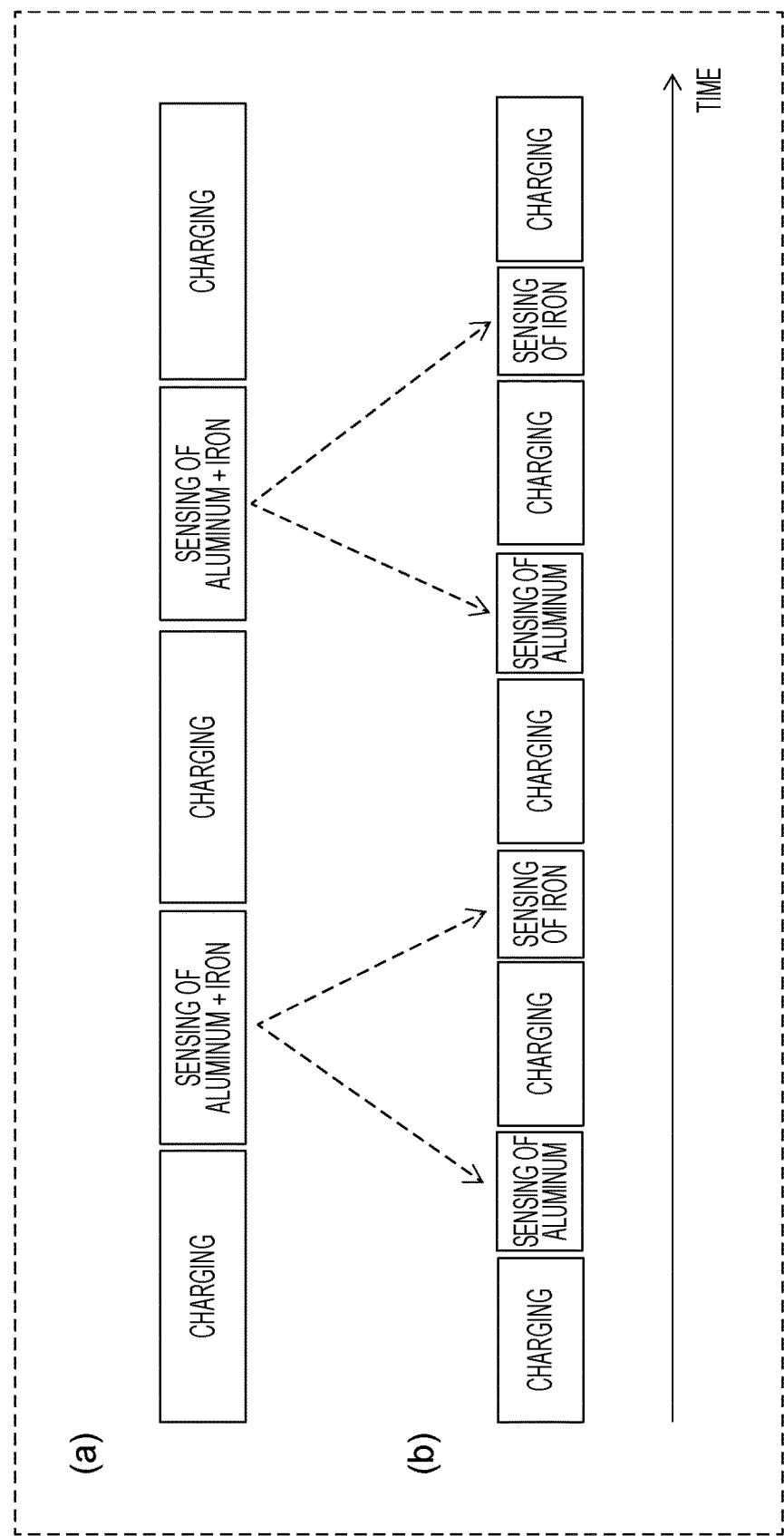

POWER TRANSMISSION DEVICE AND WIRELESS POWER TRANSMISSION SYSTEM

BACKGROUND

1. Technical Field

The present disclosure relates to a power transmission device for wirelessly transmitting electric power and a wireless power transmission system.

2. Description of the Related Art

In recent years, electronic devices and EV equipment, such as mobile phones and electric vehicles, which involve mobility have been in widespread use. Development of a wireless power transmission system for such equipment has been under way. Wireless power transmission techniques include an electromagnetic induction method, a magnetic field resonance method (resonant magnetic field coupling method), an electric field coupling method, and the like.

A wireless power transmission system of either of the electromagnetic induction method and the magnetic field resonance method includes a power transmission device with a power transmission coil and a power reception device with a power reception coil. The power transmission device is enabled to transmit power to the power reception device, without requiring direct contact of their electrodes, in such a way that the power reception coil captures a magnetic field generated by the power transmission coil. The wireless power transmission system of the magnetic field resonance method is disclosed in Japanese Unexamined Patent Application Publication No. 2009-33782 (hereinafter, referred to as JP2009-33782A), for example.

SUMMARY

In such conventional techniques, however, there is a need for a power transmission device of a wireless power transmission system capable of detecting a foreign substance with high accuracy even after power transmission starts.

In one general aspect, the techniques disclosed here feature a power transmission device comprising:
   an inverter that generates first AC power and transmits the first AC power wirelessly to a first resonator of a power receiving device via a second resonator;
   an oscillator that generates second AC power which is smaller than the first AC, and transmits the second AC power to the first resonator via a third resonator;
   a foreign substance detector that performs a series of multiple processes thereby to determine whether or not a foreign substance is present between the first resonator and the third resonator based on a physical quantity at the third resonator, the physical quantity varying depending on the second AC power; and
   power transmission control circuitry operative to:
   cause the foreign substance detector to perform the series of multiple processes before a start of a transmission of the first AC power;
   cause the inverter to start the transmission of the first AC power if the foreign substance detector determines that the foreign substance is not present;
   repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and
   cause the foreign substance detector to divide the series of multiple processes and determine whether or not the foreign substance is present as a result of performing all of the divided series of multiple processes.

It should be noted that general or specific embodiments may be implemented as a system, a method, an integrated circuit, a computer program, a storage medium, or any selective combination thereof.

According to one aspect of the present disclosure, there can be provided a power transmission device of a wireless power transmission system capable of implementing foreign substance sensing with high accuracy even after power transmission starts.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 19 is a diagram illustrating a first example of process division in the embodiment 1;

Figure 1:
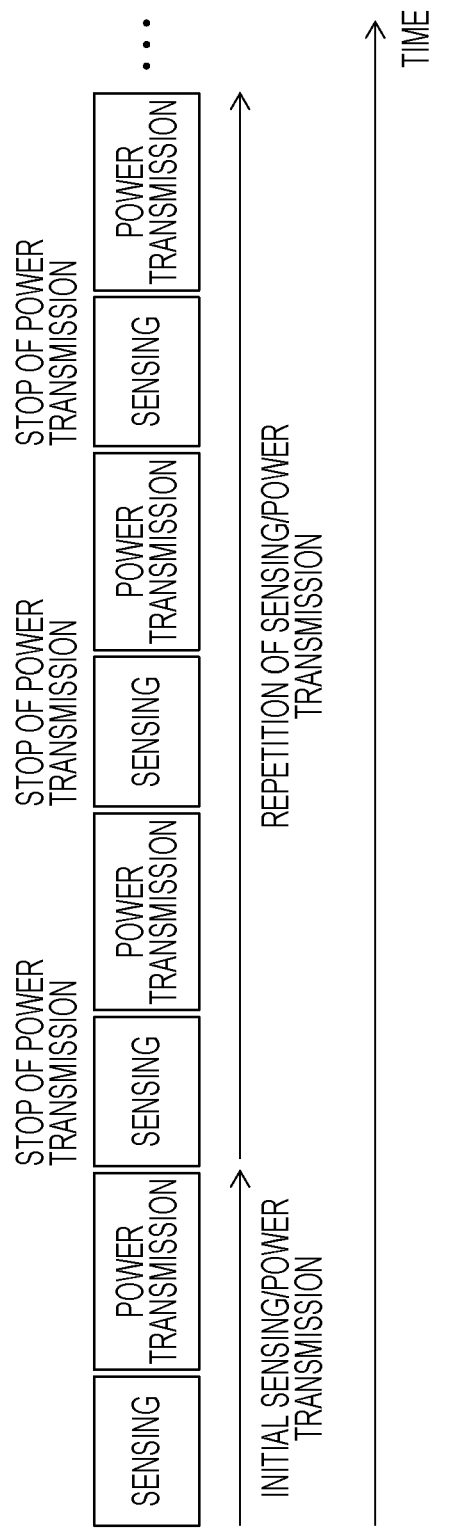
FIG. 1 is a diagram illustrating an overview of operation in a wireless power transmission system.

DETAILED DESCRIPTION (Findings as Basis for the Present Disclosure)

The inventors found that the power transmission device in the wireless power transmission system described in "BACKGROUND" have the following problems.

First, a definition of a "foreign substance" is described. In the present disclosure, a "foreign substance" means an object, such as metal or a human body (animal), which generates heat due to electric power transmitted between a power transmission coil (or a coil for sensing a foreign substance) and a power reception coil when the object is located adjacent to the power transmission coil or the power reception coil.

Next, operation of a power transmission device is described. First, when a power switch of the power transmission device is turned on, the power transmission device performs alignment of the power transmission coil of the power transmission device and the power reception coil of a power reception device. The "alignment" means operation of detecting a power transmission resonator (including the power transmission coil) in the power transmission device and a power reception resonator (including the power reception coil) in the power reception device being arranged with a positional relationship suitable for transmission of electric power. When completing the alignment of the power transmission coil and the power reception coil, the power transmission device performs foreign substance sensing to determine whether or not a foreign substance is present between the power transmission coil and the power reception coil. The foreign substance sensing may be performed by, for example, detection of a change in a physical quantity such as a voltage applied to the power transmission coil. When determining that no foreign substance is present between the power transmission coil and the power reception coil, the power transmission device transmits AC power from the power transmission coil to the power reception coil in a contactless manner.

However, even after the determination that no foreign substance is present between the power transmission coil and the power reception coil, a foreign substance may possibly enter between the coils during power transmission. For example, a case is assumed in which the power transmission device is a charging stand installed within a vehicle and the power reception device is mounted in an instrument (power reception terminal) capable of contactless charging, such as a smart phone, a tablet terminal, a mobile phone, or the like. In such a case, it is likely that a sway movement of a vehicle body during running may cause a foreign substance such as a coin to enter between the power transmission coil and the power reception coil under the charging operation. If a foreign substance enters between the power transmission coil and the power reception coil as mentioned above, an eddy current may be generated in the foreign substance and the foreign substance may be overheated.

In order to prevent overheating of a foreign substance as described above, the inventors have been considering a solution in which, after starting the power transmission, the power transmission device performs monitoring to prevent a foreign substance from being overheated, by repeating a foreign substance sensing session for performing foreign substance sensing and a power transmission session for performing power transmission.

FIG. 1 is a diagram illustrating an overview of operation in a wireless power transmission system under consideration of the inventors. In this system, a power transmission device first performs foreign substance sensing (detecting) and starts power transmission after determining that there is no foreign substance (initial sensing and initial power transmission). When a certain period of time (a few seconds, for example) elapses after the power transmission starts, the power transmission device stops power transmission and performs foreign substance sensing again. Thereafter, the power transmission device repeats the power transmission and the foreign substance sensing. Such operations enable the power transmission device to monitor an entry of a foreign substance while continuing power transmission.

Meanwhile, JP2009-33782A discloses a system that uses one power transmission coil and one power reception coil, and detects a foreign substance based on the waveform of an induced voltage of the power transmission coil. A power transmission device in this system senses a foreign substance by using a frequency different from a power transmission frequency before power transmission starts. On the other hand, during power transmission, the power transmission device periodically senses a foreign substance using the same frequency as the power transmission frequency, while transmitting electric power.

For foreign substance sensing during power transmission, one foreign substance sensing session specifically involves the following processes. That is to say, the power transmission device measures voltage waveform of the same frequency as the power transmission frequency once, computes pulse width of the voltage waveform, and determines whether or not a foreign substance is present, based on an amount of change in the pulse width from a reference value.

In this way, the power transmission device in JP2009-33782A performs a series of multiple processes including a measurement process, a computation process, and a determination process, in one foreign substance sensing session.

However, the inventors of the present disclosure found that the following problems occur in the foreign substance sensing method disclosed in JP2009-33782A.

The power transmission device in JP2009-33782A performs foreign substance sensing using the same frequency as the power transmission frequency during power transmission. In general, electric power during power transmission is much larger than that during foreign substance sensing. For example, the electric power during power transmission is approximately 100 to approximately 1000 times larger than that during foreign substance sensing. Thus, in the system in JP2009-33782A, a variation in voltage amplitude due to the presence of a foreign substance is smaller than a variation in voltage amplitude during power transmission. Consequently, an SN ratio is not sufficiently large, which makes it difficult to perform foreign substance sensing with high accuracy. Furthermore, in the system in JP2009-33782A, since foreign substance sensing is performed using the same frequency as the power transmission frequency during power transmission, the accuracy of the foreign substance sensing may be low due to an influence of the power transmission.

To address the problems described above, one possible solution is to provide a foreign substance sensing coil in addition to a power transmission coil and perform foreign substance sensing at a frequency different from a power transmission frequency during power transmission, in the same manner as that before power transmission starts.

In this possible solution, however, multiple harmonics or the like of electric power during power transmission affect the foreign substance sensing coil and causes noise in the foreign substance sensing coil. Therefore, it is still difficult to perform foreign substance sensing with high accuracy during power transmission even though the foreign substance sensing coil is provided.

JP2009-33782A also has a problem that foreign substance sensing with high accuracy is difficult to perform because the waveform of a single physical quantity (voltage) is measured only once in one time of foreign substance sensing. More specifically, although there are various foreign substances of various materials or shapes, the foreign substances of various materials or shapes cannot be sensed with the method in JP2009-33782A.

Sensing of such various foreign substances with high accuracy requires a series of multiple processes including a process to measure one or more physical quantities (a voltage applied to a power transmission coil, a frequency of the voltage, or the like, for example) multiple times (measurement process), a process to compute an index value (coupling coefficient or the like, for example) to be used in determination on the presence or absence of a foreign substance based on the physical quantities obtained from the multiple times of measurement (computation process), and a process to determine whether or not a foreign substance is present (determination process). A "physical quantity" herein means a coil-related quantity expressed in an electrical unit, such as a voltage applied to the power transmission coil, a current flowing to the power transmission coil, a frequency of the voltage applied to the power transmission coil, an input impedance value of the power transmission coil, or an input inductance value of the power transmission coil. In addition, in order to avoid an influence of power transmission, foreign substance sensing needs to be performed with the power transmission stopped.

Execution of the series of multiple processes described above, however, entails a problem that a period of one foreign substance sensing session is long. It may be possible indeed to perform foreign substance sensing with high accuracy by setting a long period for one foreign substance sensing session and performing many processes in each session. It is not preferable, however, to stop power transmission for a long period of time by allocating a long period to each foreign substance sensing session. When a proportion of length of a foreign substance sensing session to length of a power transmission session is large, the efficiency of power transmission is low. For example, when the power transmission device is a wireless charger, it takes time to complete charging a load (secondary battery, for example) of a power reception device after power transmission starts.

As described above, the inventors found that an effective method in order to sense a foreign substance with higher accuracy than the foreign substance sensing method disclosed in JP2009-33782A is to perform a series of multiple processes and to divide a foreign substance sensing session and a power transmission session. The inventors found a problem, however, that the above method results in lowering of the power transmission efficiency due to an increase in a proportion of time (power transmission stop time) in which foreign substance sensing is performed to power transmission time in which power transmission is performed.

When a power reception device is a smart phone, in particular, each manufacturer sets length of a period (referred to as a delay period) from when power transmission is stopped to when a notification unit (lamp, for example) of the power reception device notifies the stop of power transmission. Length of a delay period varies depending on a manufacturer and a model. The length may be set to length from approximately 5 msec to 10 msec, for example.

Figure 2:
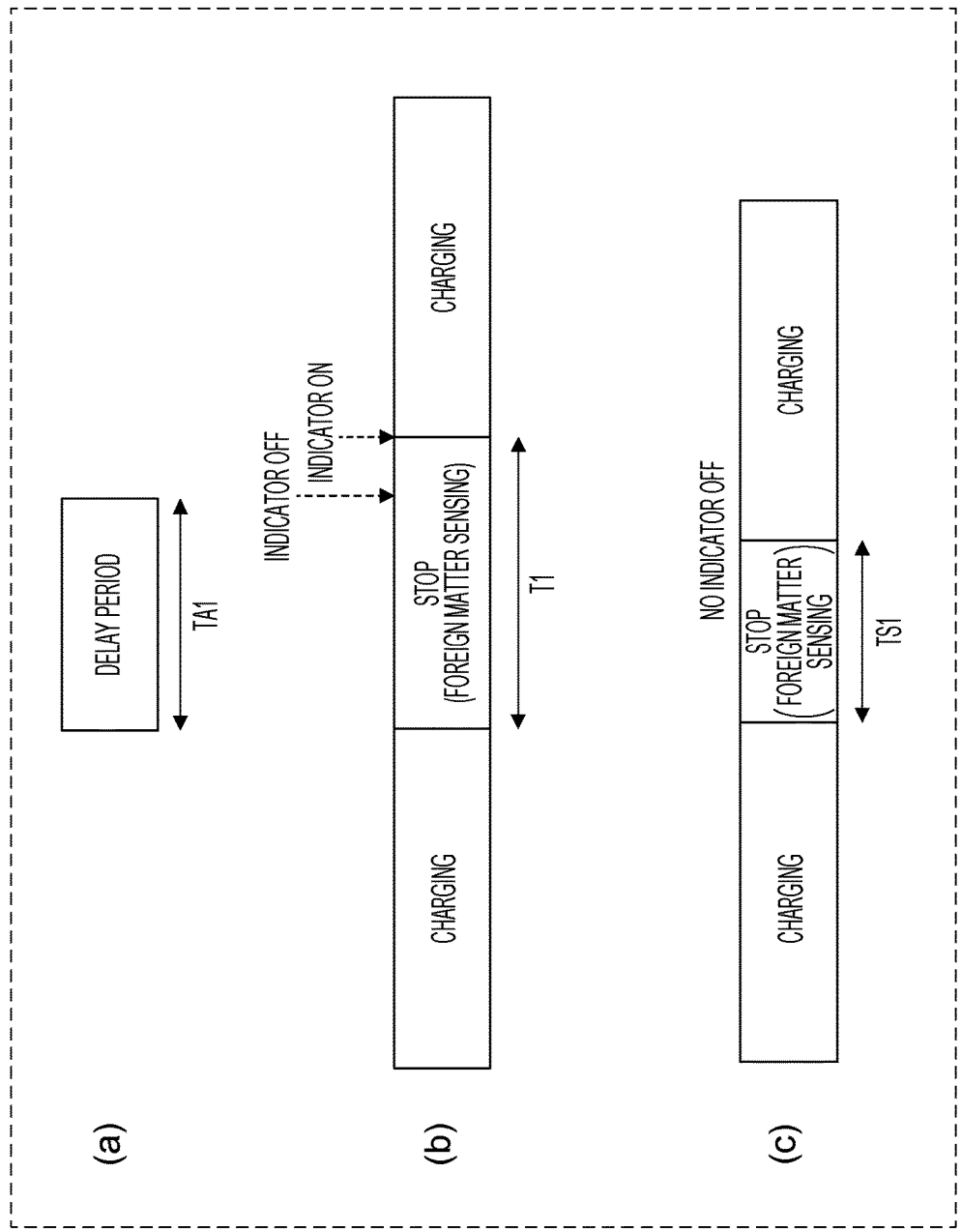
FIG. 2 is a diagram illustrating a delay period and operation of a power reception device based on the delay period.

FIG. 2 is a diagram illustrating a delay period set in a power reception device and operation of the power reception device based thereon. FIG. 2(a) illustrates length TA1 of a delay period. FIG. 2(b) illustrates an example in which power transmission stop time T1 is longer than the length TA1 of the delay period. FIG. 2(c) illustrates a case in which power transmission stop time TS1 is shorter than the length TA1 of the delay period.

As illustrated in FIG. 2(b), when the time T1 (power transmission stop time) in which power transmission (more specifically, charging) is stopped exceeds the length TA1 of delay period, a power reception module of a smart phone turns off a lamp (lamp indicating that charging is ongoing) which is lighted in the smart phone. When foreign substance sensing ends and power transmission is resumed after the stop of power transmission exceeds the length TA1 of delay period, the power reception module turns on the lamp again indicating that charging is ongoing.

On the other hand, as illustrated in FIG. 2(c), when the power transmission stop time TS1 is equal or less than the length TA1 of delay period, the power reception module keeps the lamp in a lighted state. When power transmission is resumed after the power transmission stop period TS1 elapses, the power reception module resumes power reception with the lamp remaining lighted.

Figure 3:
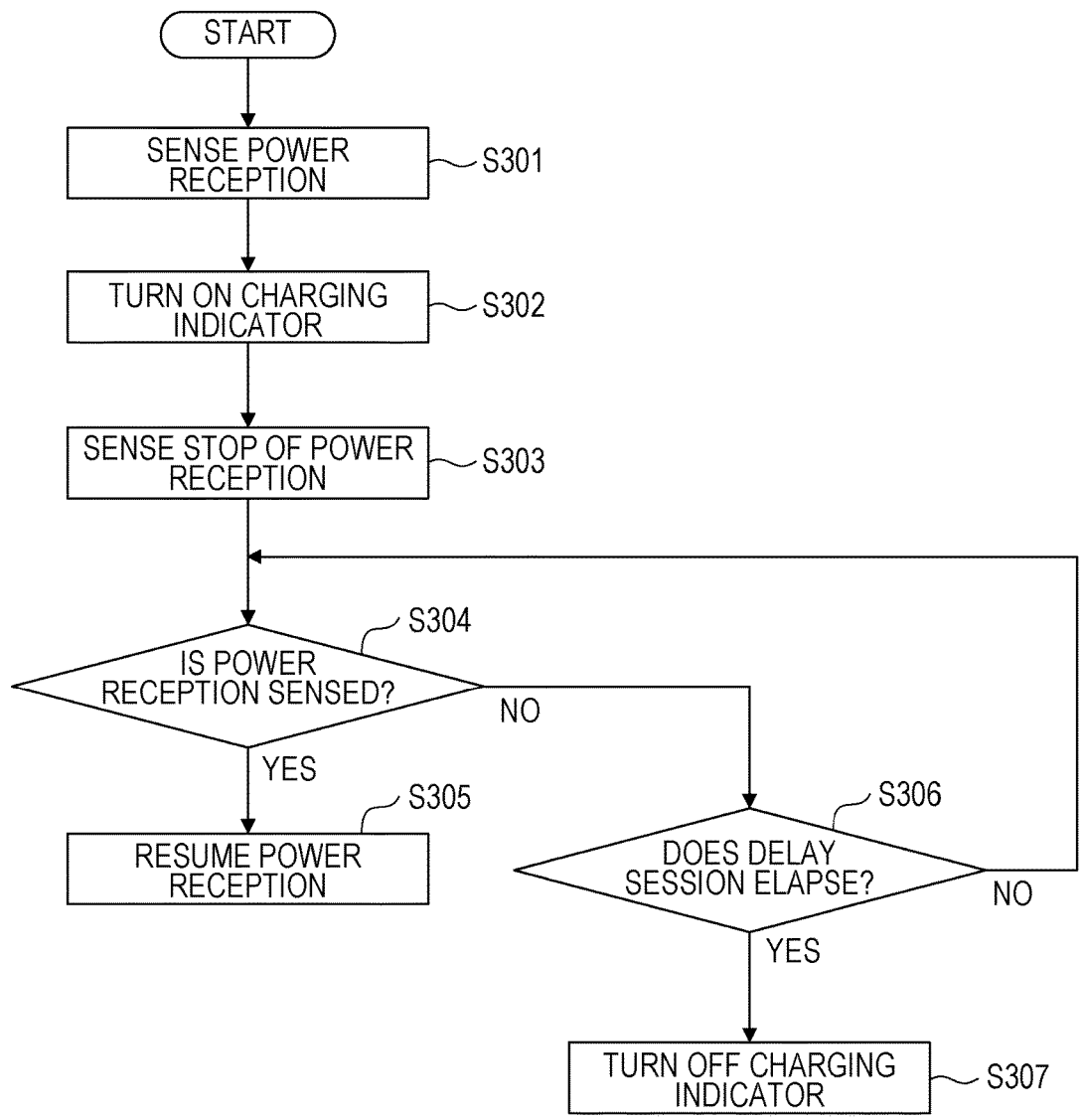
FIG. 3 is a flowchart illustrating an example of operation in the power reception device.

FIG. 3 is a flowchart illustrating the above operation in the power reception device. In step S301, when the power reception device senses reception of electric power, it proceeds to step S302 where the power reception device turns on a charging indicator (the lamp described above, for example). Then, in step S303, when the power reception device senses stop of power reception, it proceeds to step S304 where the power reception device determines for every certain time whether it senses power reception. Here, if Yes is determined, the power reception device proceeds to step S305 where it resumes power reception. If No is determined, the power reception device proceeds to step S306 where it determines whether a delay time has elapsed after the power reception device senses stop of power reception. Here, if the power reception device determines on Yes, it proceeds to step S307 where the power reception device turns off the charging indicator. If the power reception device determines on No, it returns to step S304 where the power reception device determines on sensing of power reception again.

In addition, it may not necessarily be the power reception device that directly performs the operation of turning on or off the charging indicator. For example, the power reception device has only to give a command to turn on or off to a power reception terminal mounted in the power reception module and the power reception terminal may actually turn on or off the charging indicator.

If a charging method of repeating a foreign substance sensing session and a power transmission session is applied to the power reception device that performs the operations described above, the charging indicator repeats flashing when the foreign substance sensing session is long. In an onboard charging system, in particular, if a lamp of a smart phone repeatedly turns on or off (flashes) while a user is driving, the user may become distracted.

To summarize the above, in order to perform foreign substance sensing with high accuracy when a foreign substance sensing session in which foreign substance sensing is performed and a power transmission session in which power transmission is performed are repeated after a power transmission device starts power transmission, it is necessary to perform a series of multiple processes as described above. It was found out, however, that in order to perform all of the series of multiple processes, it was necessary to extend power transmission stop time. The inventors found a problem that due to this, the power transmission efficiency was reduced and a user might become distracted by a flashing lamp while he/she was driving.

Therefore, there is desired a power transmission device that can implement foreign substance sensing with high accuracy even after power transmission starts, while preventing reduction of the power transmission efficiency by shortening power transmission stop time when a foreign substance sensing session and a power transmission session are repeated after the power transmission device starts power transmission. Furthermore, there is desired a power transmission device that shortens power transmission stop time and keeps lighted an indicator (lamp, for example) indicating that charging is ongoing.

With the above consideration, the inventors arrived at each aspect to be disclosed below.

A power transmission device according to one aspect of the present disclosure is a power transmission device comprising:

an inverter that generates first AC power and transmits the first AC power wirelessly to a first resonator of a power receiving device via a second resonator;

an oscillator that generates second AC power which is smaller than the first AC, and transmits the second AC power to the first resonator via a third resonator;

a foreign substance detector that performs a series of multiple processes thereby to determine whether or not a foreign substance is present between the first resonator and the third resonator based on a physical quantity at the third resonator, the physical quantity varying depending on the second AC power; and power transmission control circuitry operative to:

cause the foreign substance detector to perform the series of multiple processes before a start of a transmission of the first AC power;

cause the inverter to start the transmission of the first AC power if the foreign substance detector determines that the foreign substance is not present;

repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and cause the foreign substance detector to divide the series of multiple processes and determine whether or not the foreign substance is present as a result of performing all of the divided series of multiple processes.

Here, an inverter is also referred to as "an inverter circuit", an oscillator is also referred to as "an oscillation circuit", a foreign substance detector is also referred to as "a foreign matter detection circuit", or power transmission control circuitry is also referred to as "a control circuit".

According to the aspect described above, the power transmission control circuitry causes the foreign substance sensing judgment circuit (also referred to as "a foreign substance detector") to perform the series of multiple processes to determine whether or not a foreign substance is present, before transmission of the first AC power starts, and then causes the inverter circuit to start transmission of the first AC power.

After the transmission of the first AC power starts, the power transmission control circuitry repeats a foreign substance sensing session (detection period) in which the foreign substance sensing is performed and a power transmission session (detection period) in which power transmission of the first AC power is performed.

Repetition of a foreign substance sensing session and a power transmission session causes multiple foreign substance sensing sessions. In the multiple foreign substance sensing sessions, the divided processes in the series of multiple processes are performed. The power transmission control circuitry causes the foreign substance sensing judgment circuit to perform entire processing including all the processes divided in the series of multiple processes (total processing including the processes) and determine whether or not a foreign substance is present.

This can shorten length of one foreign substance sensing session, thus reducing a proportion of time to perform foreign substance sensing to power transmission time to perform power transmission (specifically, shortening of power transmission stop time). Thus, reduction of the power transmission efficiency can be prevented. This can also shorten length of one foreign substance sensing session (specifically, shorten the power transmission stop time). For example, the power transmission stop time can be made shorter than length of a delay period from when power transmission is stopped to when the power transmission stop is notified by means of a notification unit of a power reception device. Consequently, a lamp indicating that charging is ongoing can be continuously kept lighted.

Furthermore, foreign substance sensing with high accuracy can be performed by causing the foreign substance sensing judgment circuit to perform the total processing including the processes divided in the series of multiple processes and determine whether or not a foreign substance is present.

In the following, an overview of power transmission operation and foreign substance sensing operation in the present disclosure are described with reference to FIG. 4 to FIG. 6.

Figure 4:
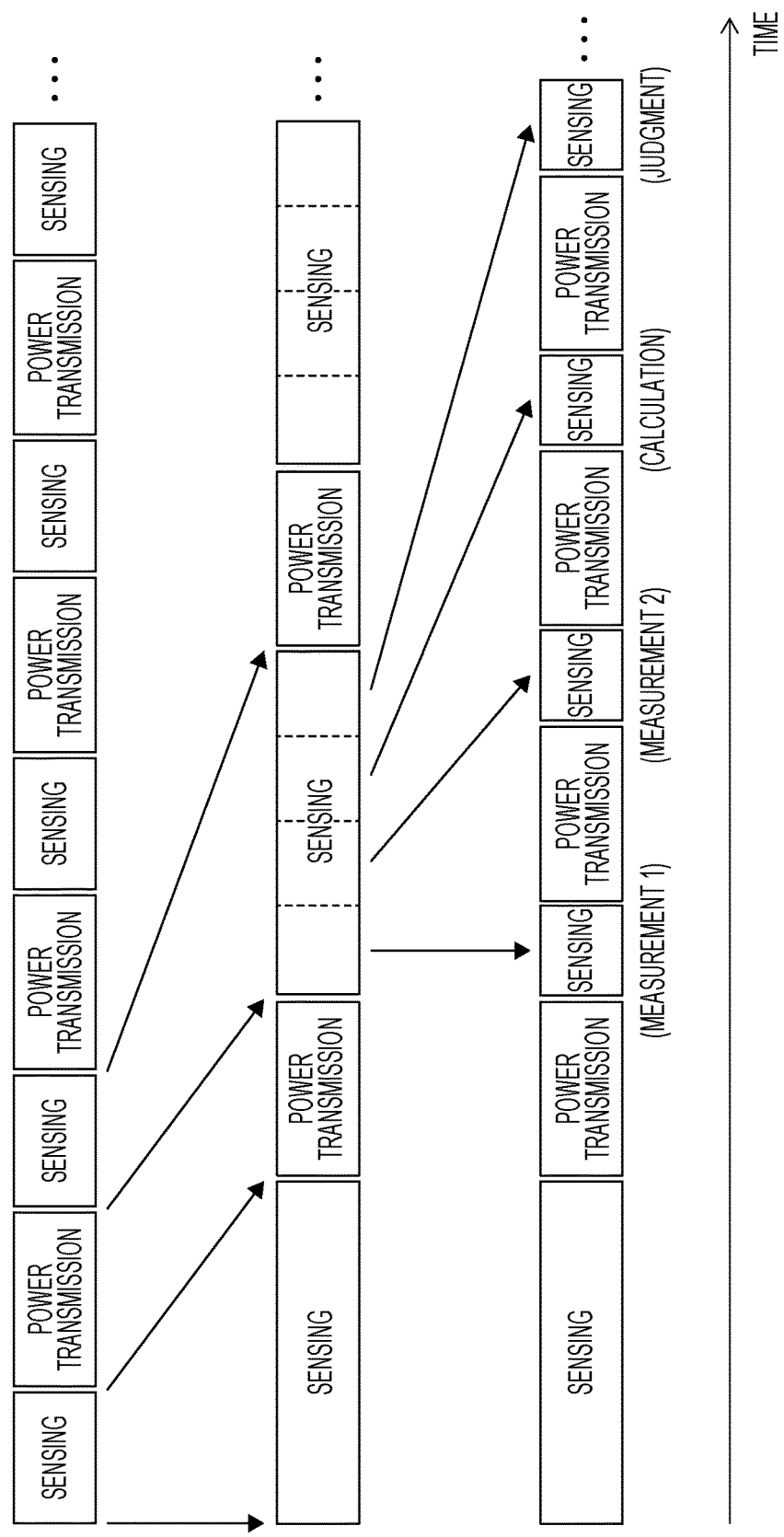
FIG. 4 is a diagram illustrating an example of a series of multiple processes divided in the present disclosure.

FIG. 4 is a diagram illustrating an example of a series of divided multiple processes in the present disclosure. The upper row in FIG. 4 illustrates an example of a case in which as with the system in JP2009-33782A, foreign substance sensing based only on one type of physical quantity is performed during two consecutive power transmission sessions. The middle row in FIG. 4 illustrates an example of a case in which foreign substance sensing with accuracy improved by the series of multiple processes is performed during two consecutive power transmission sessions. In this example, since the series of multiple processes is performed, one foreign substance sensing session is longer than foreign substance sensing based only on one type of physical quantity. The lower row in FIG. 4 illustrates an example of a case in which one foreign substance sensing session is controlled to be short by dividing and performing the series of multiple processes in repeated multiple foreign substance sensing sessions.

In this example, the series of multiple processes is divided to four processes of a first measurement process, a second measurement process, a computation process, and a determination process. The first measurement process may be a process to measure an input inductance value Lin(f1) of a power transmission coil when an oscillation circuit oscillates at a first frequency f1 which is lower than a resonance frequency fr of a power reception resonator, for example. The second measurement process may be a process to measure the input inductance value Lin(f1) of the power transmission coil when the oscillation circuit oscillates at a second frequency f2 which is higher than the resonance frequency fr of the power reception resonator, for example. The computation process may be a process to compute a coupling coefficient k from two input inductance values L1 and L2, using an expression of k≈1−Lin(f2)/Lin(f1), for example. The determination process may be a process to determine whether or not the computed coupling coefficient k has fallen below a predetermined threshold. With these four processes, a foreign substance between the power transmission coil and the power reception coil can be detected. These four processes are described in detail below.

Figure 5:
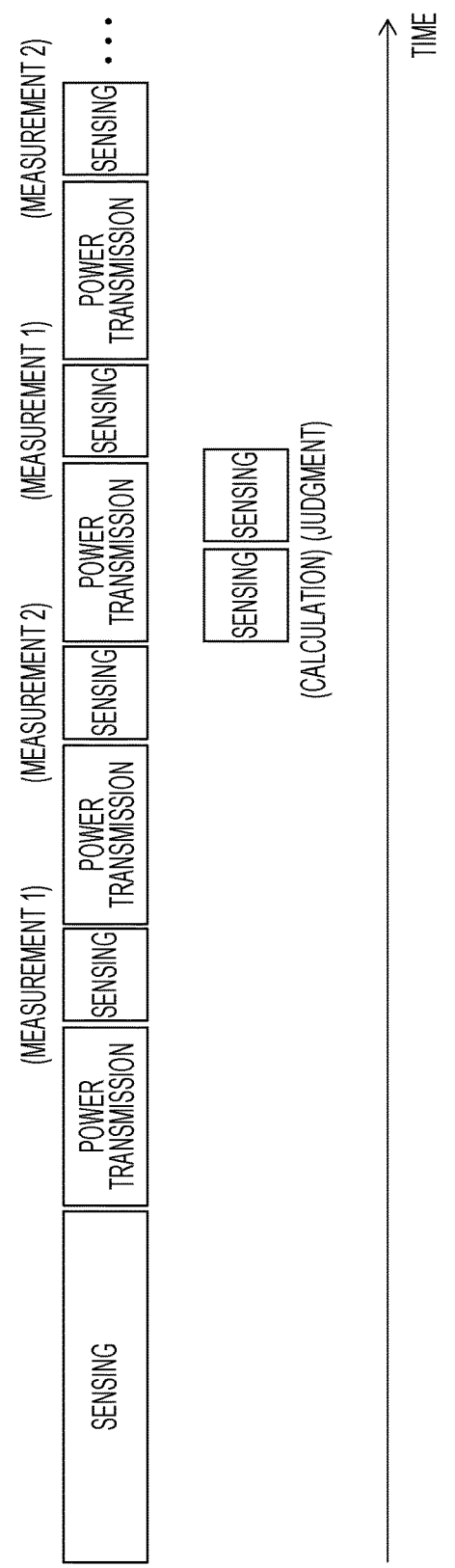
FIG. 5 is a diagram illustrating other aspects of a foreign substance sensing operation of the present disclosure.

FIG. 5 is a diagram illustrating other aspects of foreign substance sensing operation of the present disclosure. In this example, of the series of multiple processes, the power transmission device divides and performs only the first measurement process and the second measurement process in the multiple foreign substance sensing sessions, and performs the following computation process and determination process in the power transmission session. In this way, measurement of a physical quantity included in the series of multiple processes may be divided and performed in repeated multiple foreign substance sensing sessions, while the rest of the series of multiple processes other than the measurement of the physical quantity may be divided and performed in repeated multiple power transmission sessions. More specifically, only some of the series of multiple processes may be divided and performed in multiple foreign substance sensing sessions. According to this aspect, the proportion of the power transmission stop period to the entire power transmission period can be further reduced.

Figure 6:
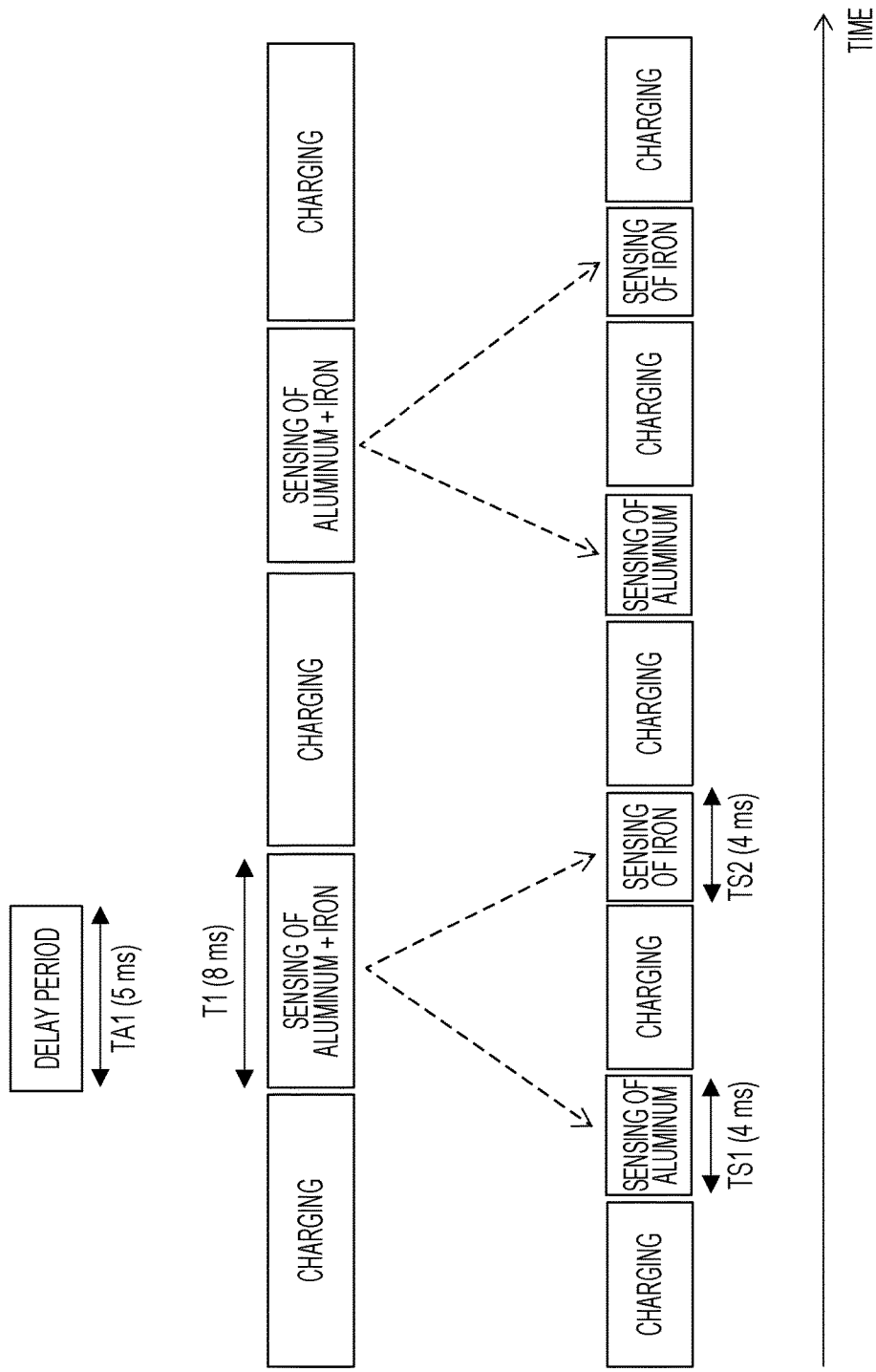
FIG. 6 is a diagram illustrating an example of effect of shortening a power transmission stop period in an embodiment of the present disclosure.

FIG. 6 is a diagram illustrating an example of effect of shortening a power transmission stop period in an embodiment of the present disclosure. In this example, a series of multiple processes includes a process to sense a foreign substance made of aluminum (which may be hereinafter referred to as an "aluminum foreign substance") and a process to sense a foreign substance made of iron (which may be hereinafter referred to as an "iron foreign substance"). As described below, an aluminum foreign substance may be detected based on a change in input inductance of a power transmission coil or a foreign substance sensing coil, for example. As described below, an iron foreign substance may be detected based on a change in voltage applied to a power transmission coil or a foreign substance sensing coil, for example.

In the example illustrated in FIG. 6, length TA1 of a delay period is 5 msec and a period TS1 taken to take an aluminum foreign substance and a period TS2 taken to detect an iron foreign substance are 4 msec. Thus, as illustrated in the middle row of FIG. 6, when sensing of an aluminum foreign substance and sensing of an iron foreign substance are performed consecutively, length of one foreign substance sensing session is approximately 8 msec. In this case, since the foreign substance sensing session is longer than the delay period, the problem of flashing indicator (more specifically, the notification unit) of the power reception device occurs.

On the other hand, as illustrated in the lower row of FIG. 6, when sensing of an aluminum foreign substance and sensing of an iron foreign substance are divided and performed, length of one foreign substance sensing session is approximately 4 msec. In this case, since the foreign substance sensing session is shorter than the delay period, the problem of flashing indicator of the power reception device can be avoided.

More specific embodiments of the present disclosure are described hereinafter with reference to drawings. Note that the present disclosure is not limited to the following embodiments. A new embodiment may be configured by making various modifications to each embodiment or combining multiple embodiments. In the following description, a same or similar component is assigned a same reference numeral.

(Embodiment 1)

Figure 7:
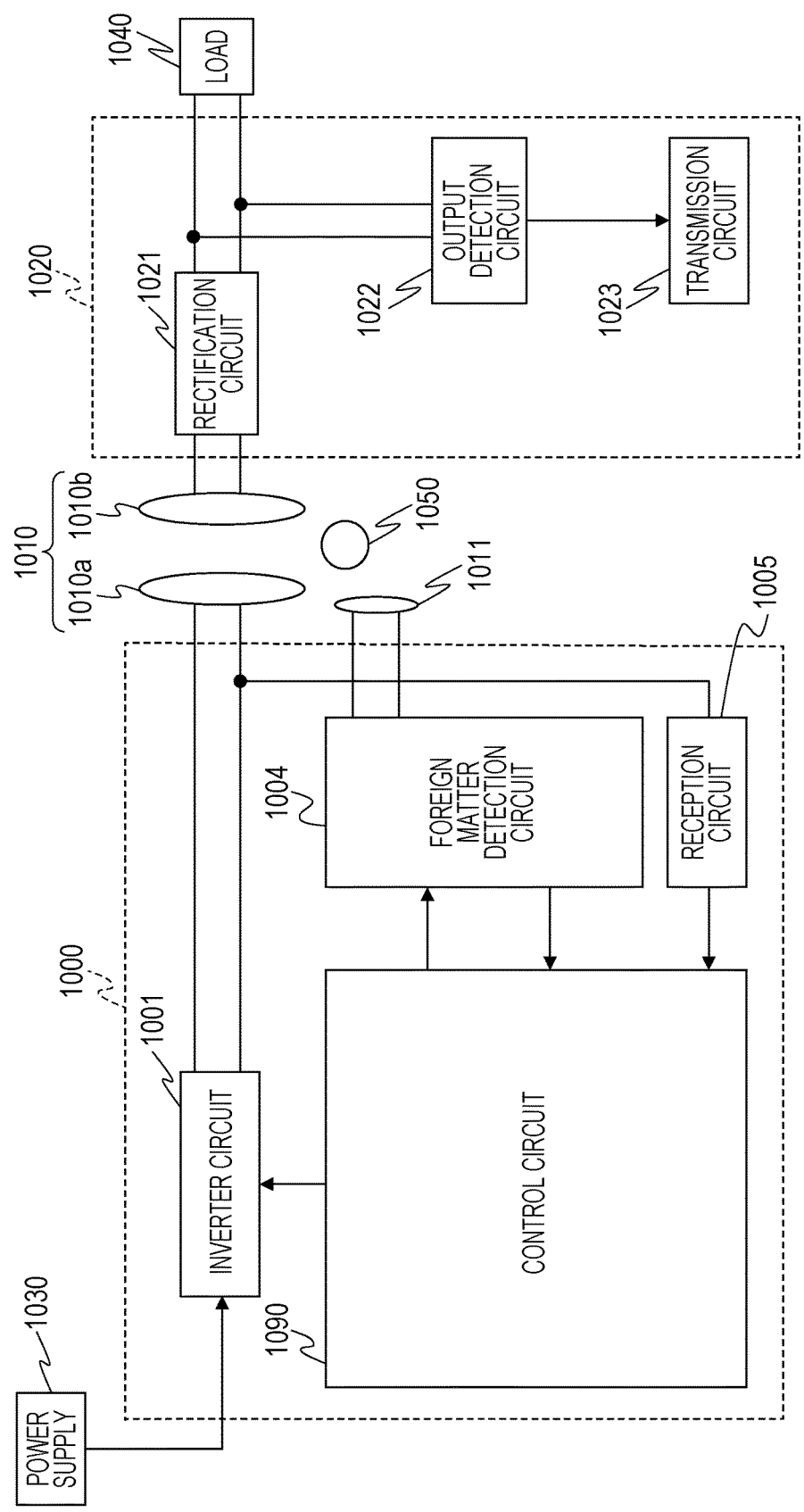
FIG. 7 is a diagram illustrating a schematic configuration of the wireless power transmission system in an embodiment 1 of the present disclosure.

FIG. 7 is a block diagram illustrating a schematic configuration of a wireless power transmission system according to an embodiment 1 of the present disclosure. The wireless power transmission system in this embodiment includes a power transmission circuit 1000, a pair of a power transmission resonator and a power reception resonator 1010, a detection resonator 1011, and a power reception circuit 1020. The power transmission circuit 1000 is configured to convert direct current (DC) energy (electric power) inputted from a direct current power supply 1030 into an AC (AC) energy (electric power) and output it. The pair of the power transmission resonator and the power reception resonator 1010 is configured to wirelessly transmit the AC energy outputted from the power transmission circuit 1000. The pair of the power transmission resonator and the power reception resonator 1010 consists of the pair of the power transmission resonator (also referred to as a power transmission antenna) 1010a and the power reception resonator (also referred to as a power reception antenna) 1010b. Each of the power transmission resonator 1010a, the detection resonator 1011, and the power reception resonator 1010*b* is configured by a resonance circuit including a coil and a condenser. The pair of the power transmission resonator and the power reception resonator 1010 wirelessly transmits to the power reception circuit 1020 the AC energy outputted from the power transmission circuit 1000 by electromagnetic induction or magnetic field resonance. The power reception circuit 1020 converts the AC energy transmitted by the pair of the power transmission resonator and the power reception resonator 1010 to the direct current energy and supplies the direct current energy to a load 1040. The detection resonator 1011 is used when a foreign substance is sensed.

In this embodiment, the power reception resonator functions as a first resonator for receiving first AC power. The power transmission resonator functions as a second resonator for transmitting the first AC power to a power reception device in a contactless manner. The detection resonator functions as a third resonator for transmitting second AC power, which is smaller than the first AC power, to the power reception device in a contactless manner.

The power transmission circuit 1000 and the power transmission resonator 1010*a* may be mounted in the power transmission device. The power reception resonator 1010*b*, the power reception circuit 1020, and the load 1040 may be mounted in the power reception device. A power reception device may be mounted in an electronic device such as a smart phone, a tablet terminal, a mobile terminal or in a motor-driven machine such as an electric vehicle. A power transmission device may be a charger that wirelessly supplies electric power to a power reception device. The load 1040 may be equipment having a secondary battery, for example. The load 1040 may be charged by the direct current energy outputted from the power reception circuit 1020.

As described below in detail, the power reception resonator 1010*b* is a parallel resonance circuit including a power reception coil and a condenser which is connected in parallel to the power reception coil. A resonance frequency is set to a predetermined value fr. The AC energy that the power reception resonator 1010*b* wirelessly receives from the power transmission resonator 1010*a* by way of a space is transmitted to the power reception circuit 1020.

The power reception circuit 1020 has a rectification circuit 1021 connected to the power reception resonator 1010*b* and the load 1040, an output detection circuit 1022 connected to the rectification circuit 1021, and a transmission circuit 1023 connected to the output detection circuit 1022. The rectification circuit 1021 converts the AC energy transmitted from the power reception resonator 1010*b* into the direct current energy and outputs it to the load 1040. The output detection circuit 1022 detects at least one of a voltage given to the load 1040 or a current flowing through the load 1040. The transmission circuit 1023 conveys to the power transmission circuit 1000 a signal (hereinafter referred to as a "feedback signal") indicative of a detection result by the output detection circuit 1022.

The power transmission circuit 1000 has an inverter circuit 1001, a foreign substance detection circuit 1004, a reception circuit 1005, and a power transmission control circuitry 1090. The inverter circuit 1001 is connected to a power supply 1030, converts the direct current energy inputted from the power supply 1030 into the AC energy by multiple switching elements and outputs it. The foreign substance detection circuit 1004 is connected to the detection resonator 1011 and performs a process to detect a foreign substance 1050 in the vicinity of the detection resonator 1011. The reception circuit 1005 receives a feedback signal transmitted from the transmission circuit 1023. The control circuit 1090 controls each circuit in the power transmission circuit 1000 so that a power transmission process using the inverter circuit 1001 and a foreign substance sensing process using the foreign substance detection circuit 1004 are repeated.

Inductance of the coil and capacity of the condenser in the detection resonator 1011 are adjusted so that the detection resonator 1011 resonates at a resonance frequency fr which is same as the power reception resonator 1010*b*.

Figure 8:
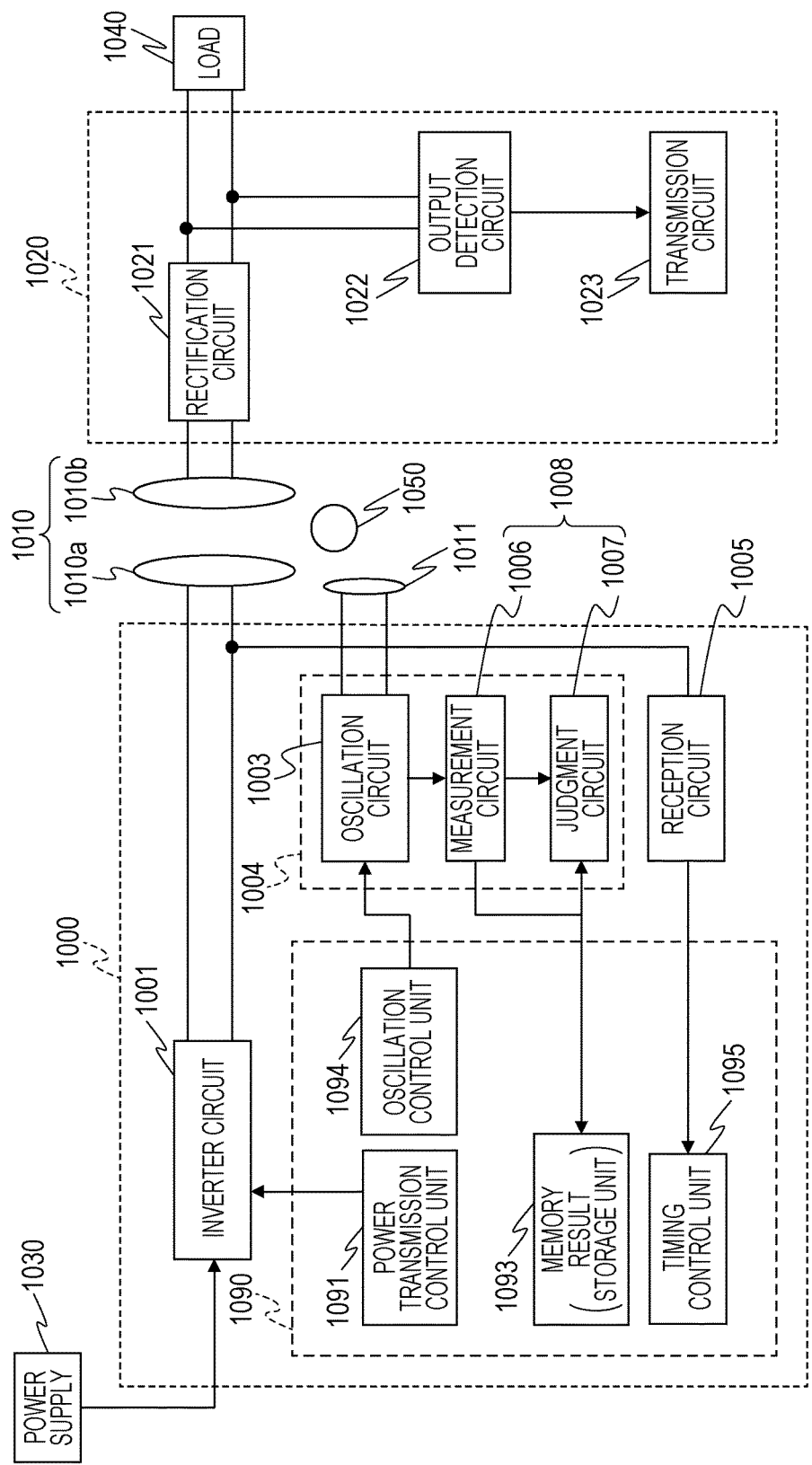
FIG. 8 is a diagram illustrating a more detailed configuration of a power transmission circuit in the embodiment 1.

FIG. 8 is a block diagram illustrating a more detailed configuration of the foreign substance detection circuit 1004 and the control circuit 1090 in FIG. 7. The foreign substance detection circuit 1004 has an oscillation circuit 1003 and a foreign substance sensing judgment circuit 1008. The foreign substance sensing judgment circuit 1008 has a measurement circuit 1006 and a judgment circuit 1007.

The oscillation circuit 1003 is connected to the power transmission resonator 1010*a*. In a foreign substance sensing session, the oscillation circuit 1003 supplies a voltage including an AC component to the detection resonator 1011. This couples the detection resonator 1011 and the power reception resonator 1010*b* electromagnetically. The oscillation circuit 1003 may be a self-exciting oscillation circuit based on the LC resonance principle, such as a Colpitts oscillation circuit, a Hartley oscillator, a clap oscillator, a Franklin oscillator circuit, or a pierce oscillator circuit.

Figure 9:
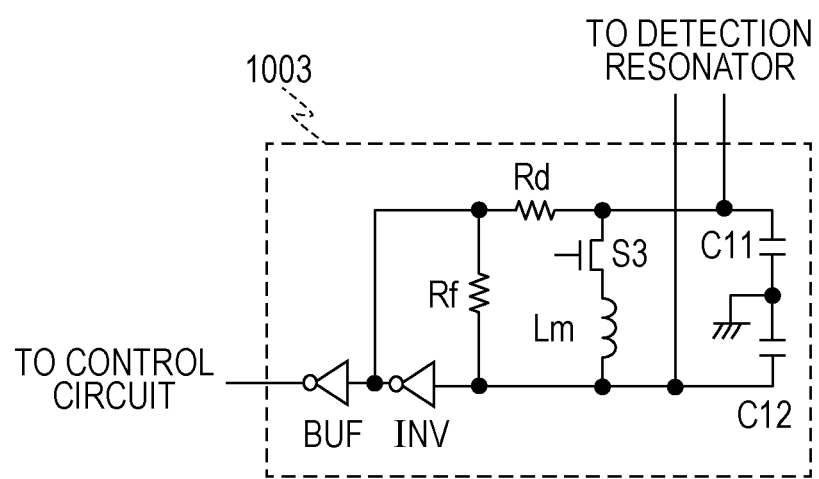
FIG. 9 is a diagram illustrating a configuration example of an oscillation circuit.

FIG. 9 is a diagram illustrating an example of a circuit configuration of the oscillation circuit 1003. The oscillation circuit 1003 illustrated in FIG. 9 is a pierce oscillator circuit that functions as a self-exciting LC oscillation circuit. Use of a self-exciting oscillation circuit enables conversion of a change in input inductance of the detection resonator 1011 into a change in an oscillatory frequency. Input inductance or a coupling coefficient can be estimated based on such an oscillatory frequency of the oscillation circuit 1003. If input inductance or a coupling coefficient can be estimated, it is possible to judge presence or absence of a foreign substance inserted in the vicinity of the detection resonator 1011 based on that change. In a configuration in which input inductance is directly measured and used, the oscillation circuit 1003 is not necessarily a self-exciting oscillation circuit.

The measurement circuit 1006 measures at least one physical quantity, such as an oscillatory frequency of the oscillation circuit 1003 or an output voltage, which varies as a foreign substance approaches the detection resonator 1011. Physical quantities that change as a foreign substance approaches include, for example, input inductance of the detection resonator 1011, an oscillatory frequency, an output voltage or an output current of the oscillation circuit 1003, a coupling coefficient of the detection resonator 1011 and the power reception resonator 1010*b*, a Q value, or the like. It can be stated that these physical quantities are physical quantities which vary depending on input impedance of the detection resonator 1011. Therefore, it can be stated that a foreign substance detection process in this embodiment is a process to judge on presence or absence of a foreign substance based on a change in input impedance of the detection resonator 1011.

The judgment circuit 1007 judges presence or absence of a foreign substance based on an amount of change from a reference value, of at least one physical quantity measured by the measurement circuit 1006. A reference value may be a value of the physical quantity when the detection resonator 1011 and the power reception resonator 1010*b* are electromagnetically coupled and a foreign substance is sufficiently away from these resonators. When a difference between a measured value and the reference value exceeds a predetermined threshold, for example, the judgment circuit 1007 judges that a foreign substance is present. Alternatively, when a value obtained from calculation using multiple measured physical quantities falls within a predetermined range, the judgment circuit 1007 may judge that a foreign substance is present. The judgment circuit 1007 stores at least one of a measurement result and a judgment result in a memory (result storage unit) 1093 in the control circuit 1090. The judgment circuit 1007 may call a result of the last judgment process from the result storage unit 1093 and combine it with a new detection result to judge whether there is a foreign substance.

At least a part of the measurement circuit 1006 and at least a part of the judgment circuit 1007 are not necessarily configured by an independent circuit. For example, they may be implemented by an integrated semiconductor package (microcontroller or custom IC, for example). The at least a part of the measurement circuit 1006 and the judgment circuit 1007 may be integrated into the control circuit 1090.

FIG. 8 also describes multiple functional blocks that the control circuit 1090 has. Those functional blocks are a power transmission control unit 1091, the result storage unit 1093, an oscillation control unit 1094, and a timing control unit 1095. The control circuit 1090 may be implemented by a combination of a processor such as a CPU (Central Processing Unit) and a computer program stored in a memory. A processor executing a command group described in a computer program, a function of each functional block illustrated in FIG. 8 is implemented. Alternatively, similar functions may be implemented by hardware such as a DSP (Digital Signal Processor) that incorporates a computer program in a semiconductor circuit. At least a part of the control circuit 1090 and at least a part of the foreign substance detection circuit 1004 may be implemented by a semiconductor package.

The power transmission control unit 1091 performs control related to power transmission. The power transmission circuit 1000 operates while alternately switching power transmission mode using the inverter circuit 1001 and foreign substance detection mode using the foreign substance detection circuit 1004. In power transmission mode, the power transmission control unit 1091 inputs a gate pulse of a predetermined frequency into each switching element in the inverter circuit 1001. This controls an AC voltage outputted from the inverter circuit 1001. A power transmission frequency in this embodiment may be set to a value ranging from 100 kHz to 200 kHz, for example. A power transmission frequency may be set to any value out of the range.

The oscillation control unit 1094 drives the oscillation circuit 1003 in foreign substance detection mode. As described in detail below, the oscillation control unit 1094 oscillates the oscillation circuit 1003 at a first frequency f1 which is lower than the resonance frequency fr of the power reception resonator 1010*b* and at a second frequency f2 which is higher than the resonance frequency fr. When the oscillation circuit 1003 has the configuration illustrated in FIG. 9, switching of the frequencies f1, f2 is performed by switching a conduction state of a switch S3. The frequency fr may be set to approximately 1000 kHz, for example. The frequency f1 may be set to a value in the range of 400 kHz to 800 kHz, for example. The frequency f2 may be set to a value in the range of 1200 kHz to 1500 kHz. The frequencies fr, f1, f2 are not limited to this example, and acceptable as far as they satisfy f1<fr<f2. In the embodiment, while fr is higher than a power transmission frequency, it may be set to the power transmission frequency or lower.

The timing control unit 1095 controls timing to transmit electric power and timing to perform a process for foreign substance detection. The timing control unit 1095 controls each unit in the power transmission control circuitry 1090 so that foreign substance detection is performed regularly during charging. After a power transmission process continues for a predetermined period of time (several seconds to several tens of seconds, for example), the timing control unit 1095 stops power transmission and starts the process for foreign substance detection. When some processes included in the foreign substance detection process complete, the timing control unit 1095 resumes the power transmission process. A period of time from when one power transmission process stops till when a next power transmission process starts (more specifically, a foreign substance sensing session) is controlled to several msec to about several tens msec, for example. Such control enables foreign substance detection without interrupting power transmission for a long time.

Length of one foreign substance sensing session (more specifically, a divided session in which a process divided in a series of multiple processes is performed) is set to a value shorter than a delay period set for a power reception device, for example. As described above, length of a delay period is a period of time from when power transmission is stopped till when a notification unit (indicator such as a lamp, for example) of the power reception device notifies the stop of the power transmission. This length may be a fixed value or may vary depending on a model of a power reception device. For example, the reception circuit 1005 may receive from the power reception device information indicating a delay period from when power transmission is stopped till when the stop of power transmission is notified by means of the notification unit of the power reception device. In such a configuration, the divided session in which each process divided from a series of multiple processes is performed may be set shorter than the delay period indicated by the received information.

The timing control unit 1095 further controls the foreign substance detection circuit 1004 so that foreign substance detection starts at timing when the reception circuit 1005 completes reception of a packet of a feedback signal. With this, loss of a packet can be prevented by starting a foreign substance detection operation during reception of a packet.

Figure 10:
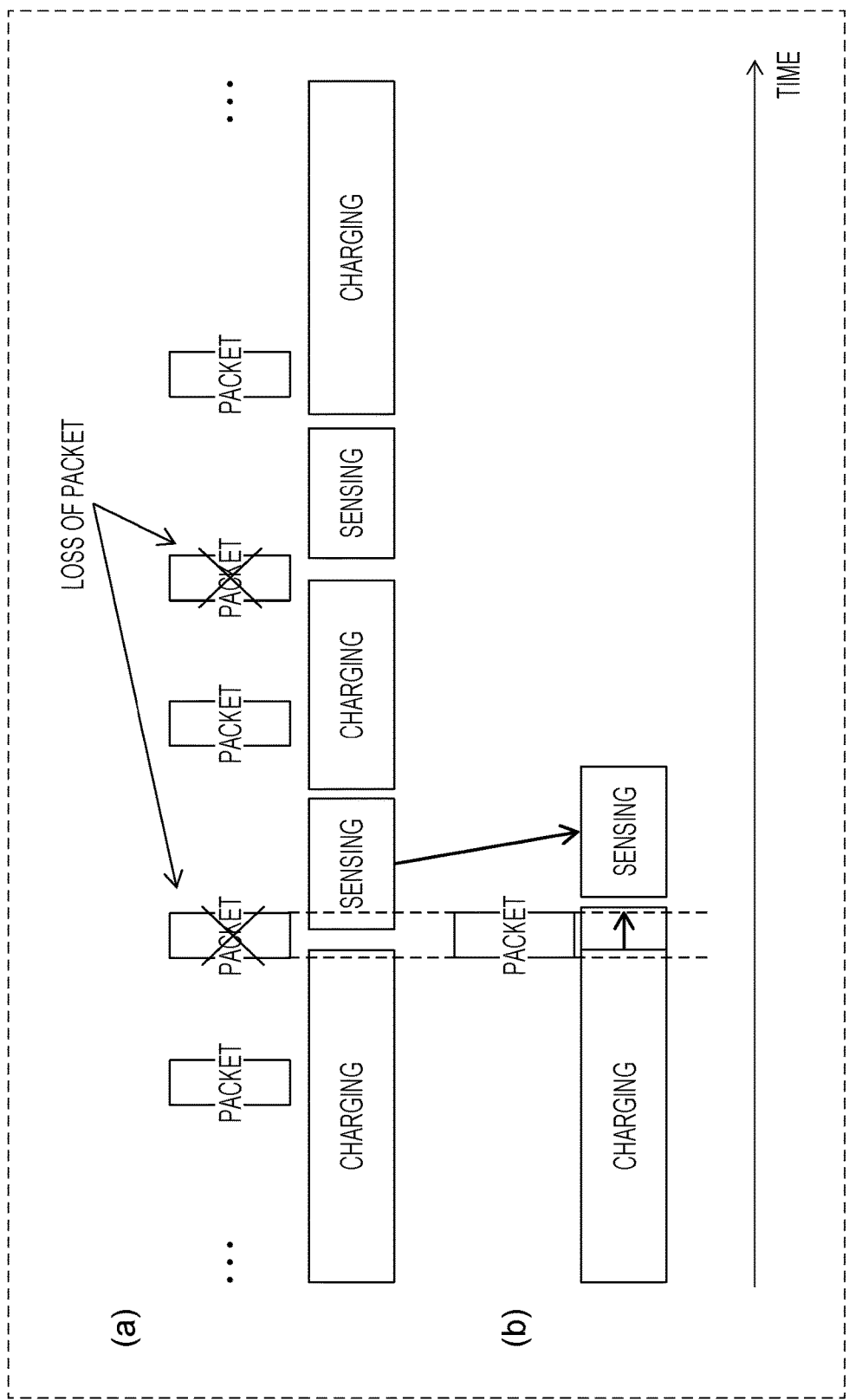
FIG. 10 is a diagram illustrating timing of charging and foreign substance sensing.

FIG. 10 is a diagram schematically illustrating timing of charging, timing of foreign substance sensing, and timing of packet reception. FIG. 10(*a*) illustrates an example of a case in which timing control is not performed. FIG. 10(*b*) illustrates an example of a case in which timing control is performed. During charging operation, the power transmission circuit 1000 receives a packet of a feedback signal which is irregularly sent from the power reception circuit 1020. As illustrated in FIG. 10(*a*), when the timing of packet reception overlaps that of foreign substance sensing, a packet may not be received normally. This is because in transmission and reception of a packet with a load modulation method, a packet is received by reading a signal component included in waveform of electric power to be transmitted. When the transmitted electric power rapidly changes as power transmission is stopped, a change in the signal component becomes smaller than a change of the electric power itself, which makes detection difficult.

In this embodiment, in order to avoid the problem described above, the timing control unit 1095 controls timing of foreign substance sensing. Specifically, the timing control unit 1095 controls each unit so that it does not perform foreign substance detection while receiving a packet. For example, as illustrated in FIG. 10(*b*), when the timing of packet reception overlaps that of stop of power transmission, start of foreign substance detection can be delayed by extending a charging period. When the timing control unit 1095 performs such control, it may shift to foreign substance detection at timing when reception of packet completes.

As described above, the foreign substance detection process in this embodiment includes a process to measure a change in a physical quantity such as a voltage or inductance, a frequency, or the like (measurement process), a process to perform calculation (computation) based on the measured physical quantity (computation process), and a process to determine on presence or absence of a foreign substance from the computed value (determination process).

An example of a foreign substance detection process in this embodiment is described hereinafter.

<Foreign Substance Detection 1: Coupling Coefficient>

In this embodiment, a coupling coefficient of the detection resonator 1011 and the power reception resonator 1010*b* can be determined to detect a foreign substance based on a value thereof.

Figure 11:
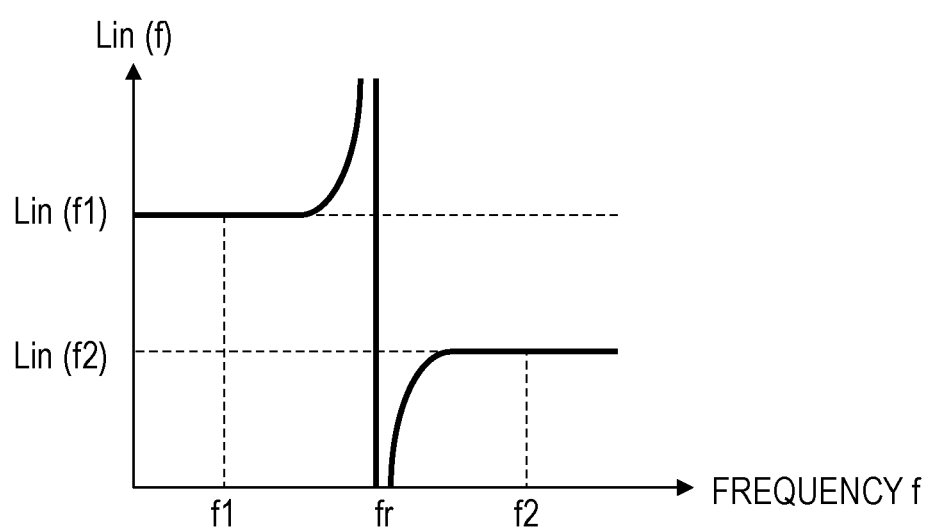
FIG. 11 is a diagram illustrating an operating principle of a coupling coefficient estimation method used in foreign substance sensing.

FIG. 11 is a diagram illustrating an operating principle of a coupling coefficient estimation method used in foreign substance detection in this embodiment. Suppose that a detection coil L1 (an inductance value is also noted as L1) and a power reception coil L2 (an inductance value is also noted as L2) resonating at a frequency fr are coupled electromagnetically by a coupling coefficient k. Then, input inductance Lin viewed from the detection coil is determined with the following expression:

$$Lin(f)=L1\{1-k^2/(1-(fr/f)^2)\} \quad \text{Expression 1}$$

FIG. 11 is a graph schematically illustrating the expression 1.

It seems that at the frequency f<<fr, both ends of the power reception resonator 1010*b* are substantially open. An input inductance value measured at a first frequency f1 which is lower than fr is Lin(f1). On the other hand, it seems that at the frequency f>>fr, both ends of a parallel condenser at the power reception resonator 1010*a* are substantially shorted. An input inductance value measured at a second frequency f2 which is higher than fr is Lin(f2).

When magnitude of f1 and f2 are appropriately set, the following approximate expression is obtained from the expression 1:

$$Lin(f1)≈L1$$

$$Lin(f2)≈L1(1-k^2)$$

The following expression 2 is obtained from these two approximate expressions:

$$k^2≈1-Lin(f2)/Lin(f1) \quad \text{Expression 2}$$

With this expression 2, the coupling coefficient k can be computed based on a ratio of Lin(f1) and Lin(f2) which are measured values. However, the expression 2 is based on a special condition that the following expressions 3 and 4 are true between input inductance Lin_open(f) when the power reception coil ends are completely opened and input inductance Lin_short(f) when the power reception coil ends are shorted:

$$Lin\_open(f1)=Lin\_open(f2) \quad \text{Expression 3}$$

$$Lin\_short(f1)=Lin\_short(f2) \quad \text{Expression 4}$$

To put it another way, if a wireless power transmission system is designed after selecting appropriate frequencies f1 and f2 that make the expressions 3, 4 true, the expression 2 is true, which enables estimation of the coupling coefficient k. In usual, there is no practical issue if these frequencies f1, f2 are set in a frequency range in which dimensions of a resonator are sufficiently smaller than wavelength.

Note that use of a self-exciting oscillation circuit enables direct conversion of a change in input inductance into a change in an oscillatory frequency. More specifically, since an inverse of a square of an oscillatory frequency dictates input inductance, the coupling coefficient can be rewritten by the following expression:

$$k^2≈1-f1^2/f2^2 \quad \text{Expression 5}$$

In practice, since a linear/non-linear element of a circuit is included, the expressions 2 and 5 need to be corrected. However, in principle, the coupling coefficient k can be estimated from these expressions (Details of a correction example is described below with reference to FIG. 12).

With the above description, if an input inductance value in two frequencies or an oscillatory frequency are measured while continuously switching operations to oscillate at each of the frequencies f1 and f2, the coupling coefficient k can be estimated from a measurement result. The coupling coefficient k varies depending on a shield state of a magnetic field due to a foreign substance between transmission and reception coils. Therefore, for example, when an estimated coupling coefficient k is below a predetermined threshold, it can be determined that a foreign substance is present between the power reception coil and the power transmission coil.

An example for implementing foreign substance detection based on the principle described above is described hereinafter.

Figure 12:
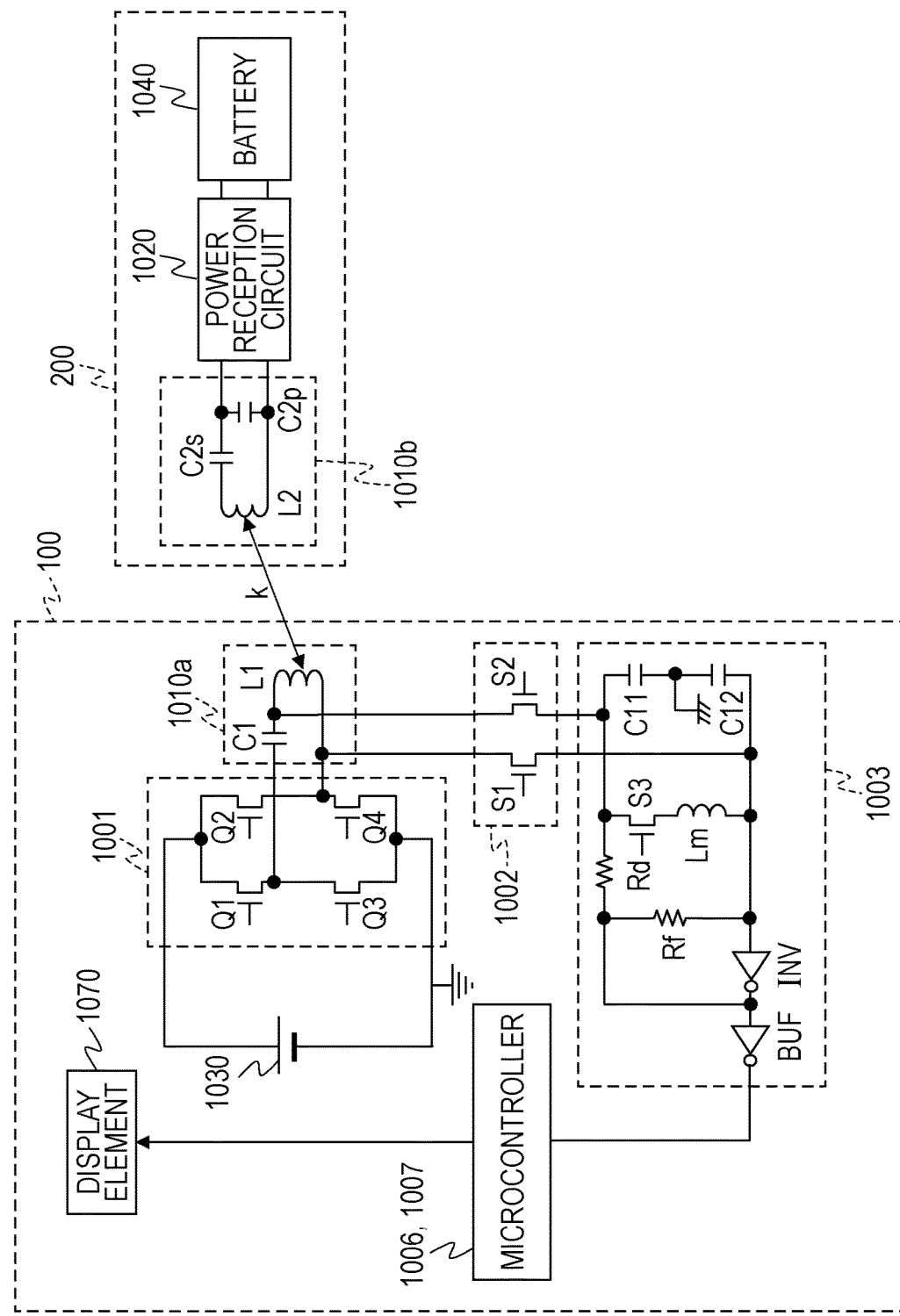
FIG. 12 is a diagram illustrating a specific circuit configuration example of a power transmission device and a power reception device.

FIG. 12 is a diagram illustrating a specific circuit configuration example of a power transmission device 100 and a power reception device 200 in this embodiment. In this example, the load 1040 is a secondary battery, and the measurement circuit 1006 and the judgment circuit 1007 are implemented by a microcontroller (microcontroller). A display element 1070 for notifying a user of a foreign substance detection result is mounted in the power transmission device 100. The display element 1070 may be an LED light source or a display. In the example illustrated in FIG. 12, the power transmission resonator 1010*a* also functions as the detection resonator 1011. Thus, a power transmission resonator and a detection resonator may be a common resonator. The power transmission device 100 includes a switch 1002 for switching a connection state of the oscillation circuit 1003 and the power transmission resonator 1010*a*.

The power transmission resonator 1010*a* has a power transmission coil L1 and a condenser C1 connected in series with the power transmission coil L1. The power reception resonator 1010*b* has a power reception coil L2, a condenser C2*p* connected in parallel with the power reception coil L2, and a condenser C2*s* connected in series with the power reception coil L2.

In this example, outside diameter of the power transmission coil L1 is set to 39 mm and inductance is set to L1=13.6 μH. Outside diameter of the power reception coil L2 is set to 34 mm and inductance is set to L1=15.8 μ. Capacity of a series capacitor C1 is set to 180 nF, and capacity of a series capacitor C2*s* and that of a parallel capacitor C2*p* are respectively set to C2*s*=120 nF and C2*p*=1590 pF. The power transmission coil L1 resonates at 100 kHz and the power reception coil resonates at 115 kHz and 1000 kHz.

The power transmission coil L1 is connected to the oscillation circuit 1003 by way of a selector switch 1002 including switches S1, S2. The selector switch 1002 electrically shuts off the power transmission coil L1 and the oscillation circuit 1003 in a power transmission session. The selector switch 1002 electrically connects the power transmission coil L1 and the oscillation circuit 1003 in a foreign substance sensing session. In the foreign substance sensing session, the inverter circuit 1001 is stopped.

The oscillation circuit 1003 in this embodiment is a pierce oscillation circuit that functions as a self-exiting LC oscillation circuit. A resistance Rf and a resistance Rd that the oscillation circuit 1003 has are elements to adjust excitation level of a circuit. The oscillation circuit 1003 further includes an adjustment inductor Lm and a switch S3 for changing an oscillatory frequency. Values of Lm and C11, C12 are determined so that oscillation takes place at two frequencies f1—400 kHz (S1 and S2 on, S3 off) and f2—1500 kHz (S1 and S2 on, S3 on) which are different from resonance frequencies of the power reception coil fr=115 kHz, fr=1000 kHz. C1 and C2s seem shorted at f1 and f2 and C2p seem open at f1 and shorted at f2. Thus, it may be considered that a main condenser involved in estimation of a coupling coefficient is C2p. In addition, an estimation expression of a coupling coefficient in this circuit configuration example is the following expression (expression 6) in which correction is made on the expression 5:

$$k^2 \approx 1 - f1^2/f2^2/(f2^2 - f3^2)$$  Expression 6

An oscillatory frequency f3 is an oscillatory frequency when S1 and S2 are turned off and S3 is turned on. More specifically, measuring the frequency f3 is equivalent to measuring an inductance value of the adjustment inductor Lm. When the power transmission coil L1 oscillates at the frequency f2, the oscillatory frequency includes a component based on an input inductance value of the power transmission coil L1 and a component based on an inductance value of the adjustment inductor Lm. Thus, the expression 6 removes effect of the adjustment inductor Lm in the denominator in the second term and then computes a coupling coefficient. In this way, the measurement circuit 1006 may detect a foreign substance based on the coupling coefficient k to be computed by the correction formula 6 based on the expression 5, instead of the expression 5. Note that a correction formula is not limited to the expression 6 since various circuit topology exist in the self-exciting LC oscillation circuit, as described earlier. For example, an oscillatory frequency can be changed by switching the condensers C11, C12 in FIG. 12 to a different condenser. In that case, a correction formula differs from the expression 6. Even when a circuit topology that differs from the above is adopted, derivation of a correction formula of the expression 5 is easy. Similarly, when the expression 2 is used, the coupling coefficient k may be computed by using a correction formula that is corrected according to a circuit topology. In addition, a value of each parameter described above is an example, and may be set to a value different from the above. An important point is that impedance z2−1/jωC2p of the power reception resonator 1010 is relatively large at the frequency f1 and relatively small at the frequency f2. Here, j is an imaginary number unit, w is an angular frequency, and a relation of ω=2πx frequency is established.

Then, a flow of a foreign substance detection process based on a coupling coefficient is described with reference to a flowchart in FIG. 13.

First, when the control circuit 1090 senses approaching of the power reception resonator 1010b to the detection resonator 1011, it starts foreign substance sensing mode. Sensing of "approach" in this embodiment is not based on the operating principle of foreign substance sensing described above. Sensing of "approach" may be performed by detecting a change in an oscillatory frequency or a voltage, for example. When the power reception resonator 1010b approaches the detection resonator 1011, an oscillatory frequency may increase or amplitude of a voltage outputted from the oscillation circuit 1003 may drop, due to effect of metal (board grand or coil, or the like) in the power reception resonator 1010b. In addition, when the power reception coil L2 in the power reception resonator 1010b includes an electromagnetic shield (magnetic material) for reducing effect of electromagnetic noise on a peripheral circuit, an oscillatory frequency may drop as the power reception resonator 1010b approaches. Therefore, detection of a change in an oscillatory frequency or voltage enables approaching of the power reception resonator 1010b to be sensed. The oscillation control unit 1094 and the oscillation circuit 1003 may be such configured that they perform intermittent oscillation (intermittent operation) which oscillates ACs worth of several sessions only once in 1 msec to a few seconds and that they switch to continuous operation only when they sense approach of the power reception coil L2. Approach of the power reception coil L2 can be sensed by performing such an intermittent operation, while controlling an increase in power consumption. An operating frequency of the oscillation circuit 1003 in this intermittent operation may be an arbitrary frequency.

Then, in step S600, the oscillation control unit 1094 causes the oscillation circuit 1003 to operate at the frequency f1.

In step S601, the measurement circuit 1006 measures input inductance and a voltage after a predetermined period of time elapses.

In step S602, the oscillation control unit 1094 causes the oscillation circuit 1003 to operate at the frequency f2.

In step S603, the measurement circuit 1006 measures input inductance and a voltage after a predetermined period of time elapses.

In step S604, the judgment circuit 1007 computes a coupling coefficient from a series of measurement results with the expression 2. In step S605, the judgment circuit 1007 judges whether or not a voltage has exceeded a predetermined first threshold. The first threshold may be set to a numeric value in the range of 0.3 to 0.5, for example. When the computed coupling coefficient k exceeds the first threshold, it is determined that no foreign substance is present between the power reception coil L2 and the power transmission coil L1. In this case, the judgment circuit 1007 stores in the result storage unit 1093 information indicating accordingly. The oscillation control unit 1094 stops oscillation of the oscillation circuit 1003 based on this information (step S606). Then, a display element such as an LED light source, not shown, mounted in a power transmission device or a power reception device may be caused to emit light or a display of a power reception device may be caused to display that power transmission starts. With this, a user can be notified that no foreign substance is present between coils and charging can be performed safely.

Then, the power transmission control unit 1091 drives the inverter circuit 1001 and starts wireless power transmission. Note that wireless power transmission may be started not immediately after oscillation of the oscillation circuit 1003 is stopped, but, for example, after it is confirmed that variations in a frequency stops, by a user placing a power reception device on a power transmission device, or the like.

On the other hand, in step S605, when the coupling coefficient k does not exceed the predetermined first threshold, the display element may be caused to flash or the display element may display that a foreign substance is present. With this, a user can be informed that a foreign substance is present between coils and power transmission is dangerous.

In addition, although the coupling coefficient k is computed by the expression 2 here, the coupling coefficient may be computed by the expression 5. Instead, the coupling coefficient k may be computed by the correction formula of the expression 2 or the expression 5 as described above.

Through the foregoing operation, a foreign substance located near the power transmission coil L1 and the power reception coil L2 can be detected, and information indicating the detection result can be outputted. This enables a user to know whether power transmission can be performed safely.

Figure 13:
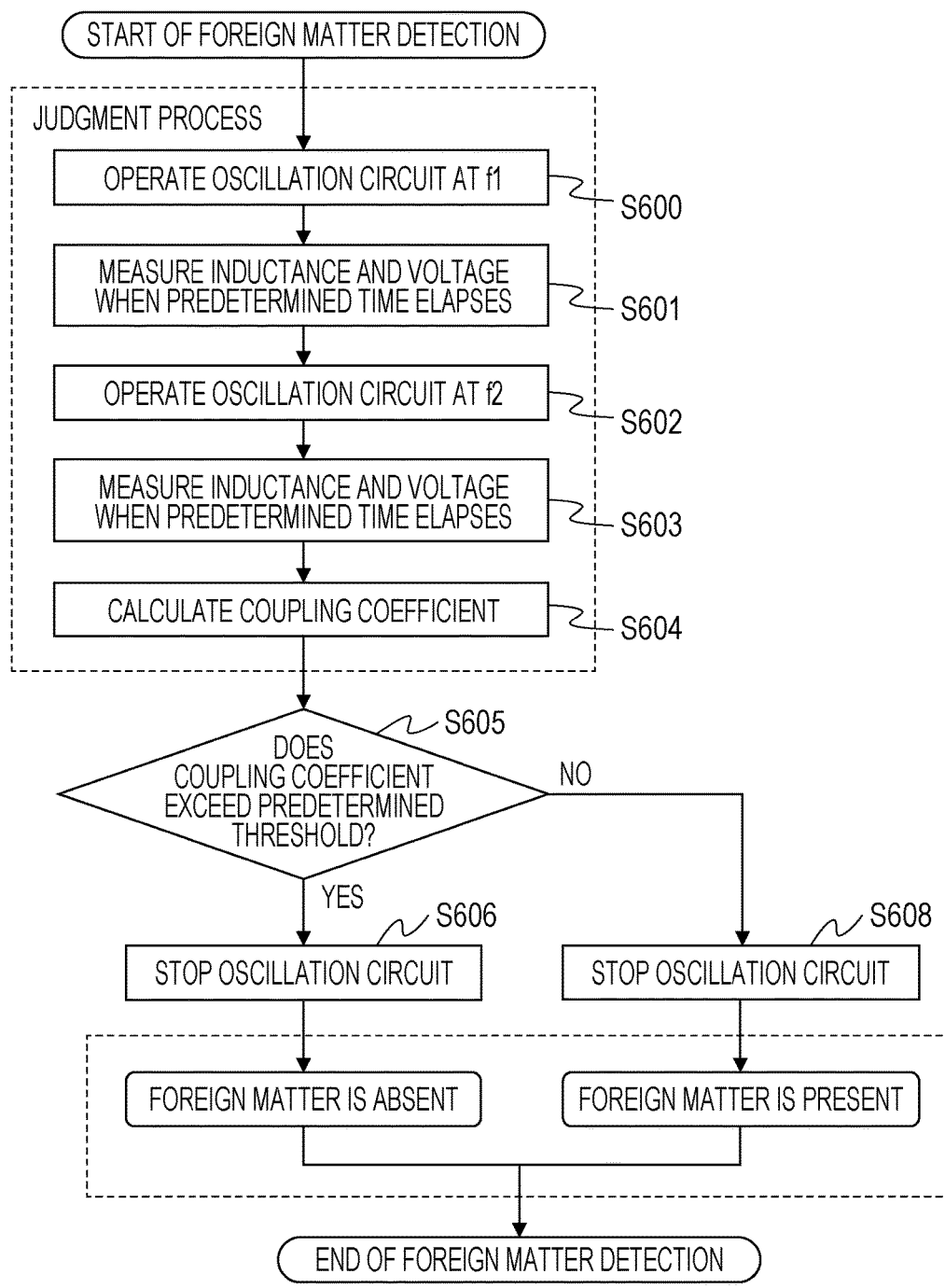
FIG. 13 is a flowchart illustrating a flow of a foreign substance sensing process based on a coupling coefficient.

Note that the operation in this embodiment is not limited to the operation illustrated in FIG. 13. For example, the judgment process in step S605 is evaluated not only by an absolute quantity of whether or not a predetermined coupling coefficient k is exceeded but also by whether or not a temporal change amount of the coupling coefficient k is sufficiently small. In addition, detection of a foreign substance may be performed based on other physical quantity, in addition to the coupling coefficient k.

<Foreign Substance Detection 2: Input Inductance and Voltage>

Detection of a foreign substance can also be performed based on an input inductance of a detection coil or a voltage outputted from an oscillation circuit 1003. An example of such a foreign substance detection process is described hereinafter.

Figure 14:
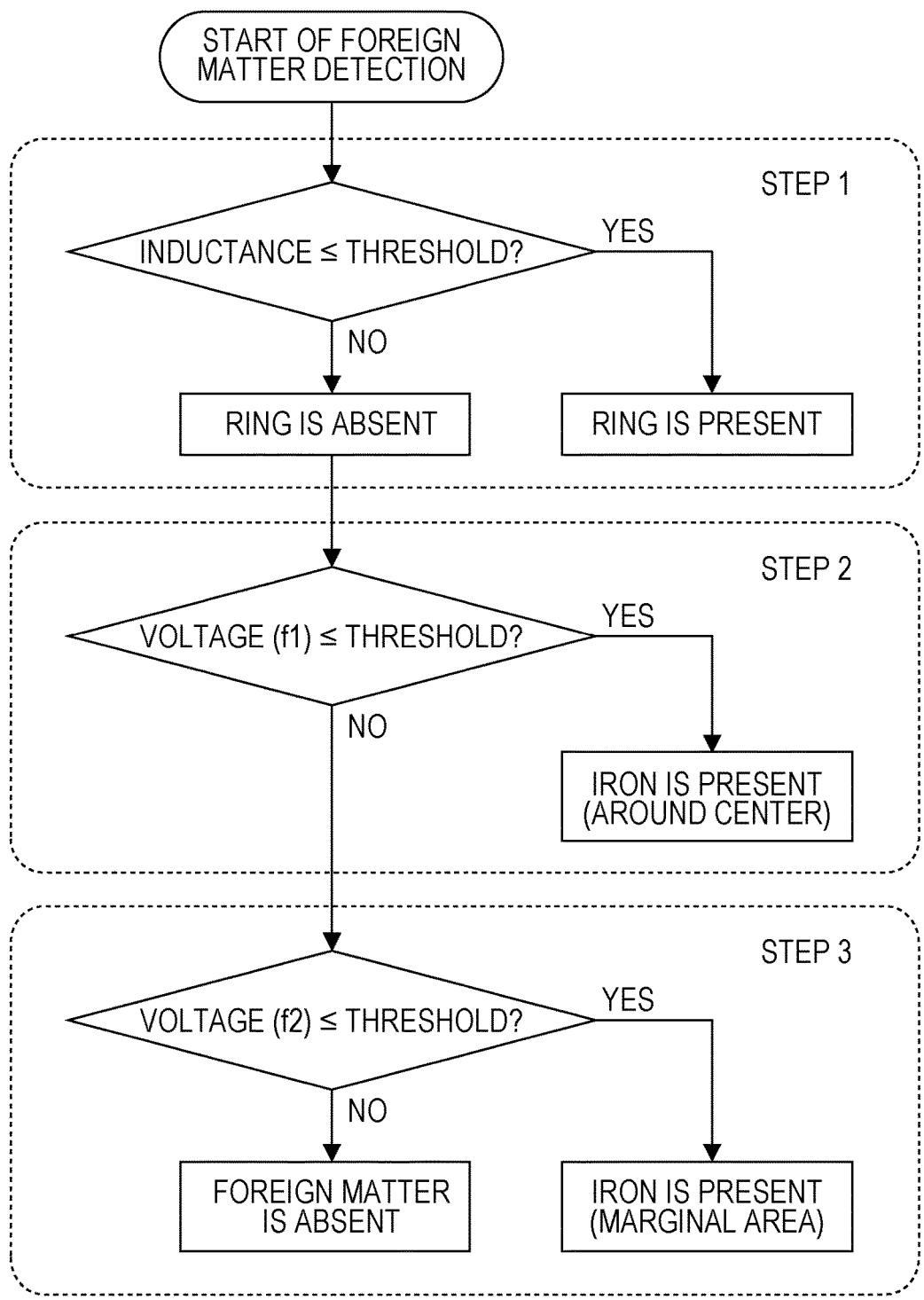
FIG. 14 is a flowchart illustrating other example of the foreign substance sensing process.

FIG. 14 is a flowchart illustrating a foreign substance detection process in this example. In this example, the foreign substance sensing judgment circuit 1008 detects a foreign substance through different three-phase processes. Here, input inductance of the detection resonator 1011, an output voltage of the oscillation circuit 1003 at the frequency f1, and an output voltage of the oscillation circuit 1003 at the frequency f2 are selected as a physical quantity (parameter) to be measured. The foreign substance sensing judgment circuit 1008 judges whether or not each is below a predetermined threshold. With this, a foreign substance can be detected with high accuracy, without depending on properties or position of a foreign substance.

Three-stage steps (Steps 1 to 3) in this embodiment are described in detail hereinafter.

<Step 1>

When metal that shields the magnetic field is present between a power transmission coil and a power reception coil, an electric current of an inverse phase to the coils flows on the metal surface, thus reducing input inductance of the coils. Thus, when the input inductance of the coils fall below a threshold, it can be judged that a foreign substance is present. However, since a coupling coefficient changes depending on a combination of a detection coil and a power reception coil, an amount of inductance to be reduced varies. Therefore, a foreign substance between coils can also be detected in a coil pair of a different combination by making an inductance threshold Lth a function of a coupling coefficient k. In the example illustrated in FIG. 14, when the input inductance of the coil is below a predetermined threshold, it is judged that a foreign substance which easily shields the magnetic field (ring-shaped metal foreign substance, for example) is present. In contrast, when the input inductance of the coil exceeds the predetermined threshold, it is judged that such a foreign substance is not present.

<Steps 2 and 3>

When metal that does not easily shield the magnetic field (iron or the like, for example) is present between the power transmission coil and the power reception coil, the magnetic field passes through the foreign substance and thus a coupling coefficient does not fall easily. Hence, sensing is difficult with the method described above. In such a foreign substance, however, an eddy current is generated when the magnetic field passes through the foreign substance and a voltage drops at a coil end. Thus, amplitude of oscillation waveform (voltage) drops. Therefore, when amplitude of a coil-end voltage is below a predetermined threshold, it can be judged that a foreign substance is present. However, since a coupling coefficient differs depending on a combination of a detection coil and a power reception coil, an amount of voltage to be reduced varies. Thus, a voltage threshold Vth is made a function of the coupling coefficient or a function of inductance Lin (or an oscillatory frequency f). With this, a foreign substance between coils can be detected in a coil pair of a different combination.

In Step 2, the judgment circuit 1007 judges whether or not a coil-end voltage when the oscillation circuit 1003 oscillates at the frequency f1, which is smaller than the resonance frequency fr, is equal to or less than a predetermined threshold. When a pair of resonators is coupled at a frequency lower than the resonance frequency fr, magnetic flux in the vicinity of the center of the power transmission coil and the power reception coil is dense (odd mode). Therefore, in this case, sensitivity of detecting a foreign substance that is present in the vicinity of the center of the power transmission coil and the power reception coil is high. Hence, in Step 2, it can be detected whether or not a metal foreign substance such as iron that does not easily shield the magnetic field is present in the vicinity of the center of the power transmission coil and the power reception coil.

In Step 3, the judgment circuit 1007 judges whether or not a voltage at the coil end when the oscillation circuit 1003 oscillates at the frequency f2, which is larger than the resonance frequency fr, is equal to or less than the predetermined threshold. When the pair of resonators is coupled at a frequency higher than the resonance frequency fr, magnetic flux in a peripheral area away from the center of the power transmission coil and the power reception coil is dense (even mode). Therefore, in this case, the sensitivity of detecting a foreign substance that is present in the peripheral area away from the center of the power transmission coil and the power reception coil is high. Hence, in Step 3, it can be detected whether or not a metal foreign substance such as iron that does not easily shield the magnetic field is present in the peripheral area away from the center of the power transmission coil and the power reception coil.

In this example, while the processes are performed in the order of Step 1 to Step 3, the order of these steps may be changed. In addition, only a part of these steps may be performed.

<Method for Setting a Threshold>

An idea of threshold determination is described hereinafter.

Figure 15:
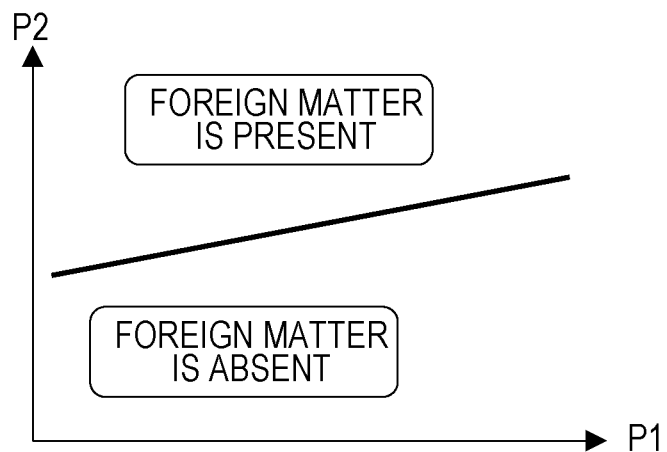
FIG. 15 is a diagram illustrating a first example of a method for setting a threshold.
Figure 16:
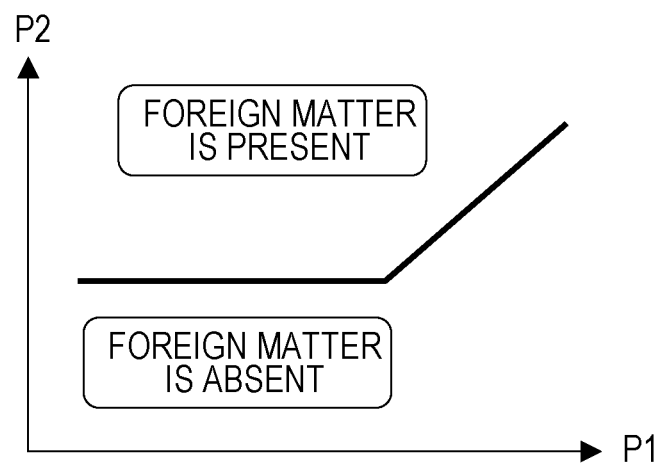
FIG. 16 is a diagram illustrating a second example of the method for setting a threshold.

When a judgment is made on presence or absence of a foreign substance based on multiple parameters, as described above, there are various methods for setting a threshold, as illustratively illustrated in FIG. 15 to FIG. 16. As described above, parameters include inductance, resistance, a Q value of a coil, or a frequency or a voltage value that can be obtained from conversion of these parameters, or the like. An example of setting a threshold when two parameters P1, P2 are selected therefrom is described in the following.

Figure 17:
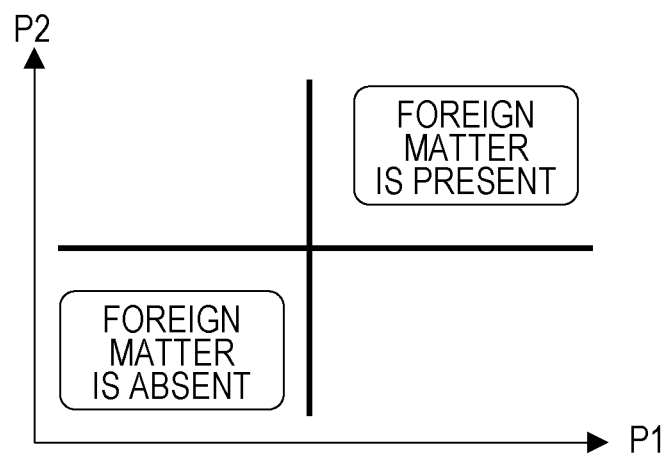
FIG. 17 is a diagram illustrating a third example of the method for setting a threshold.
Figure 18:
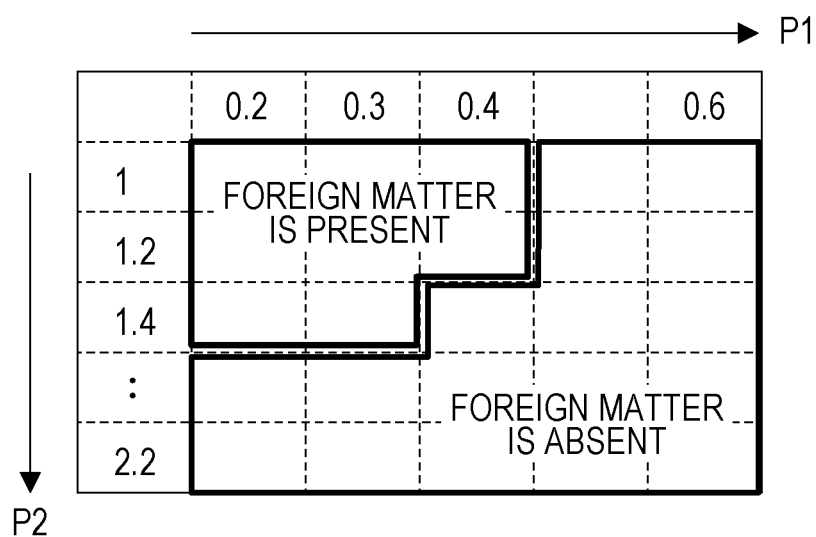
FIG. 18 is a diagram illustrating a fourth example of the method for setting a threshold.

FIG. 15 is a diagram illustrating an example in which a threshold of the parameter P2 is a linear function of the parameter P1. This case has the effect that a judgment process is simple, thus being able to alleviate calculation load. In addition, as illustrated in FIG. 6, until P1 reaches a certain value, the threshold of P2 may be set to a fixed value, and when P1 exceeds that value, the threshold of P2 may be set to the linear function of P1. Alternatively, the threshold of P2 may be a linear function that varies depending on a range of P1. A threshold thus being linearly set in multiple stages, the accuracy of detecting a foreign substance can be improved while alleviating the calculation load. As illustrated in FIG. 17, a threshold may be set independently for each of the parameters P1 and P2. This can further make judgment simple. Alternatively, as illustrated in FIG. 18, a method can also be conceived that a combination of values of the parameters P1 and P2 in a case in which a foreign substance is present and a case in which no foreign substance is present are retained in advance as a table value in a memory of the control circuit. This method has an advantage that judgment can be reliably made on presence or absence of a foreign substance although memory usage increases.

Next, an example of division of a foreign substance detection process in this embodiment is described. As described earlier, the foreign substance sensing judgment circuit 1008 in this embodiment detects a foreign substance in the vicinity of the detection resonator 1011 by performing the foreign substance sensing process including multiple steps. These multiple steps may include, for example, a step of measuring a physical quantity such as the above-mentioned input inductance or voltage, frequency, or the like, a step of computing other physical quantity such as a coupling coefficient or the like through a calculation based on the measured physical quantity, and a step of judging presence or absence of a foreign substance through comparison of these physical quantities with a predetermined threshold. Measurement or calculation of multiple different physical quantities may be divided into multiple steps and performed. The foreign substance sensing judgment circuit 1008 performs different steps in the foreign substance detection process before or after one power transmission process.

<Process Division Example 1: Division According to a Foreign Substance Type>

FIG. 19 is a diagram illustrating a first example of division of process in the embodiment 1. In this example, a process is divided according to a type of a foreign substance to be detected. Here, a case is assumed in which a foreign substance made of aluminum (aluminum foreign substance) and a foreign substance made of iron (iron foreign substance) are detected at different timing. Note that a foreign substance type is not limited to this example.

FIG. 19(a) illustrates an example of a case in which an aluminum foreign substance and an iron foreign substance are sensed altogether. FIG. 19(b) illustrates a case in which sensing of an aluminum foreign substance and sensing of an iron foreign substance are divided. As illustrated in FIG. 19(a), when an aluminum foreign substance and an iron foreign substance are detected in batch, processing takes much time. In contrast to this, as illustrated in FIG. 19(b), when a detection process of an aluminum foreign substance and a detection process of an iron foreign substance are divided, individual processing time is shorter than the case of batch processing.

Figure 20A:
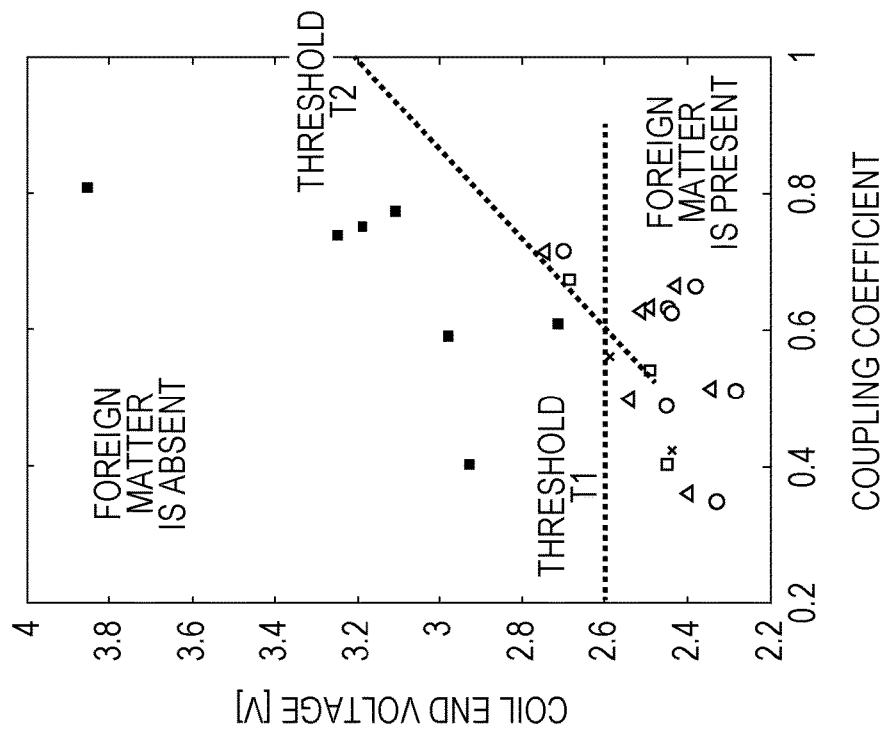
FIG. 20A is a diagram showing results of measurements of a coupling coefficient and an input inductance value in each of a case in which an aluminum foreign substance is present and a case in which an aluminum foreign substance is not present, for seven models of evaluation terminals.

FIG. 20A is a diagram showing results of measurements of a coupling coefficient and an input inductance value in each of a case in which an aluminum foreign substance is present and a case in which an aluminum foreign substance is not present, using seven models of evaluation terminals including a power reception coil ($\phi$22 mm to 40 mm) and a power transmission coil ($\phi$43 mm). The power reception coil of the seven models of evaluation terminals is connected to a parallel condenser and a resonance frequency fr which is determined depending on a power reception coil and the parallel condenser is set to 1000 kHz. An oscillation circuit is a self-exciting pierce oscillation circuit. Here, a ring ($\phi$22 mm) made of aluminum that shields the magnetic field is selected as an aluminum foreign substance for evaluation.

As shown in FIG. 20A, when an aluminum foreign substance is present, inductance is smaller than a threshold T0 which is a linear function of a coupling coefficient. Thus, an aluminum foreign substance can be distinguished based on a coupling coefficient and inductance.

Figure 20B:
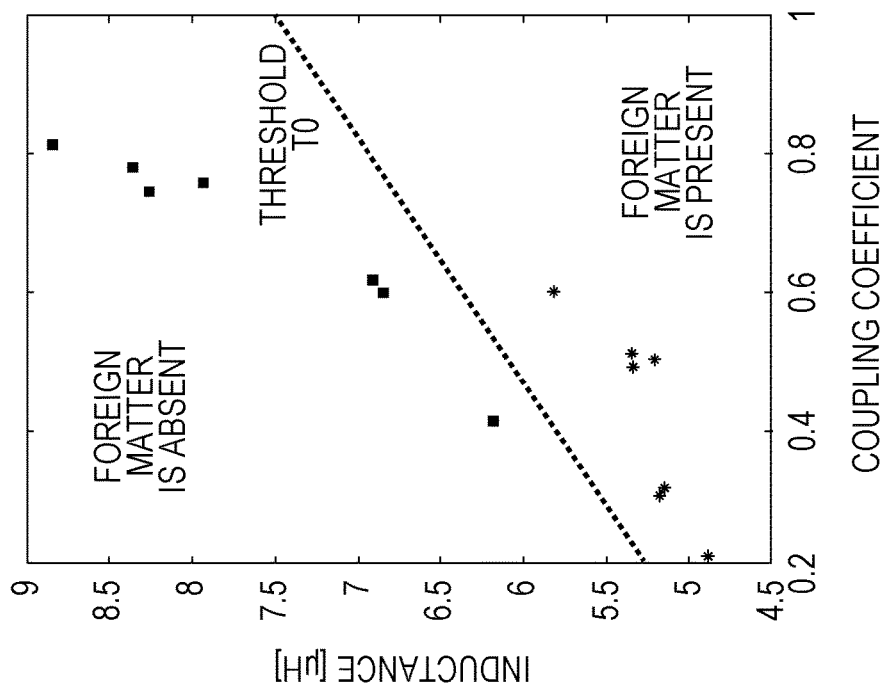
FIG. 20B is a diagram showing results of measurements of a coupling coefficient and a coil-end voltage in each of a case in which an iron foreign substance is present and a case in which an iron foreign substance is not present, for the seven models of evaluation terminals.

FIG. 20B is a diagram showing results of measurements of a coupling coefficient and a coil-end voltage in each of a case in which an iron foreign substance is present and a case in which an iron foreign substance is not present, under the same conditions as above. Here, an iron disk ($\phi$15 mm) that does not easily shield the magnetic field is selected as an iron foreign substance for evaluation. For the case in which a foreign substance is present, a position of the iron disk offset from the center of the power transmission coil is set to four types of 0 mm, 5 mm, 10 mm, 15 mm.

As shown in FIG. 20B, when an iron foreign substance is present, the coil-end voltage is smaller either of thresholds T1, T2. Therefore, an iron foreign substance can be distinguished based on a coupling coefficient and a voltage.

In this way, a physical quantity necessary for judgment varies depending on a type of a foreign substance to be detected. For this reason, in order to detect multiple foreign substances, a necessary physical quantity is larger and processing takes much time. In this embodiment, a physical quantity to be measured in one process is reduced by dividing a detection process for each target foreign substance, thus shortening processing time.

Note that for a coupling coefficient necessary for detection of both aluminum and iron, a value determined in detection of one may be used in detection of the other. For example, a value of a coupling efficient acquired for an aluminum detection process may be stored in the result storage unit 1093 and judgment on presence or absence of a foreign substance may be made by measuring only a voltage when detecting an iron foreign substance. This can shorten the processing time when detecting an iron foreign substance.

Thus, according to this embodiment, not only a foreign substance can be detected with high accuracy even during charging through the use of an oscillation circuit that operates at a frequency different from a power transmission frequency, but also processing time taken for one detection process can be shortened. Therefore, interruption time of charging can be controlled.

<Process Division Example 2: Division According to a Frequency>

A second example of process division is described hereinafter. In this example, processes are divided according to multiple frequencies used in foreign substance detection. Multiple frequencies are, for example, the frequencies f1 and f2 in the above description.

Figure 21:
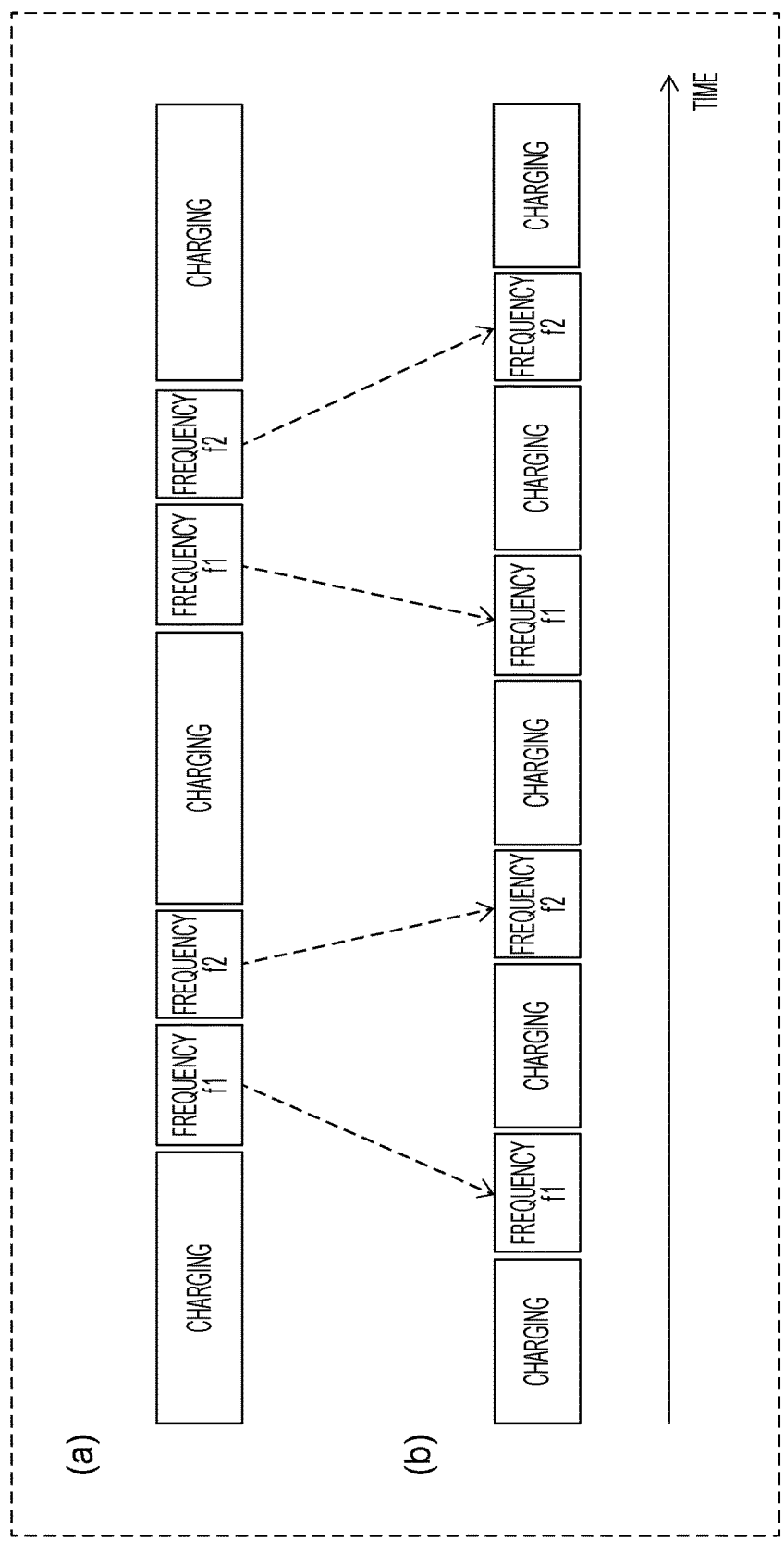
FIG. 21 is a diagram illustrating a second example of the process division in the embodiment 1.

FIG. 21(a) illustrates an example in which a process at the frequency f1 and a process at the frequency f2 are performed consecutively. FIG. 21(b) illustrates a case in which the process at the frequency f1 and the process at the frequency f2 are divided. As described above, a coupling coefficient can be estimated by causing the oscillation circuit 1003 to operate at two frequencies f1 and f2 and based on a ratio of input inductance of a detection coil in a state in which it oscillates at each of the frequencies. In order to perform the processes using the two frequencies in batch, however, an oscillatory frequency of the oscillation circuit 1003 needs to be switched halfway. Thus, processing cannot be performed in parallel. Since these processes are serially processed, it takes much time. Thus, as illustrated in FIG. 21(b), separation of processes for every frequency can make the interruption time during charging shorter than batch processing.

In this example, the measurement circuit 1006 stores in the result storage unit 1093 a measurement result of when the oscillation circuit 1003 oscillates at the frequency f1. When a measurement result of when the oscillation circuit 1003 oscillates at the frequency f2 is obtained, the judgment circuit 1007 reads the result stored in the result storage unit 1093. The judgment circuit 1007 computes a coupling coefficient by using both results and calculating. This coupling coefficient can be used in detection of the aluminum foreign substance or the iron foreign substance as described above.

Note that in this example, calculation is not performed when the measurement process at the frequency f1 ends, which is non-limiting example. When the measurement process at the frequency f1 is complete, the judgment circuit 1007 may read the last measurement result at the frequency f2 from the result storage unit 1093 to calculate a coupling coefficient. This can shorten time to measure a physical quantity at the frequency f2.

<Process Division Example 3: Measuring a Same Physical Quantity More Than Once>

A third example of division of processes is described hereinafter. In this example, in order to improve the detection accuracy, a process of foreign substance detection in which a same process is performed more than once is divided.

Figure 22:
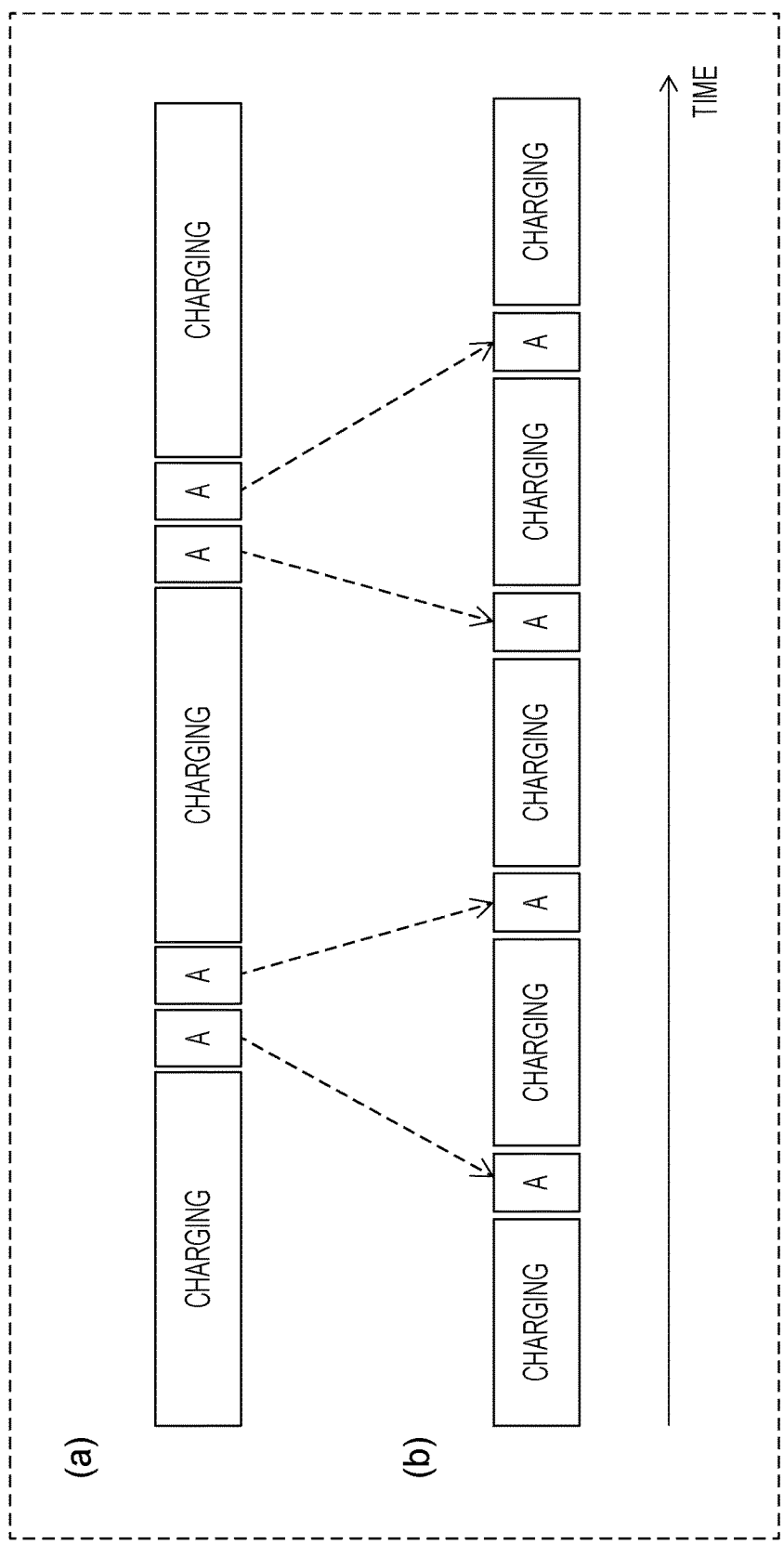
FIG. 22 is a diagram illustrating a third example of the process division in the embodiment 1.

FIG. 22 is a diagram illustrating this division example. FIG. 22(a) illustrates an example in which a measurement process A for one physical quantity is performed twice in a row. FIG. 22(b) illustrates a case in which the measurement process A is divided to each session. The measurement process A represents a process to measure one physical quantity of a voltage, an input inductance, a frequency or the like in the description above. In this example, the measurement process A is performed twice, which is a non-limiting example. Instead, the measurement process A may be performed three times or more until accuracy can be ensured. Performing the measurement process A more than once and taking a mean of measurement results improve the accuracy of the measurement result. However, if the number of times of repetition is increased to improve the accuracy, the stop time becomes longer accordingly. Thus, if a measurement process is divided, as illustrated in FIG. 22(b), the processing time per session can be shortened while ensuring the accuracy of detection. Consequently, the interruption time of power transmission per session can be shortened.

A process division method is not limited to this and various aspects are possible. If a measurement process and a calculation process are divided into multiple steps and results in the middle of the processes are stored in the result storage unit 1093, the results can be called to make a judgment when necessary physical quantities are ready.

<Process Division Example 4: Changing Frequency>

A fourth example of process division is described hereinafter. In this example, when detecting a foreign substance by performing a measurement process A and a measurement process B, the foreign substance detection circuit 1004 changes frequency of the processes according to time taken for these processes. The process A and the process B may be a process to measure two different physical quantities in the description above. Here, it is assumed that time taken for the measurement process A is shorter than time taken for the measurement process B.

Figure 23:
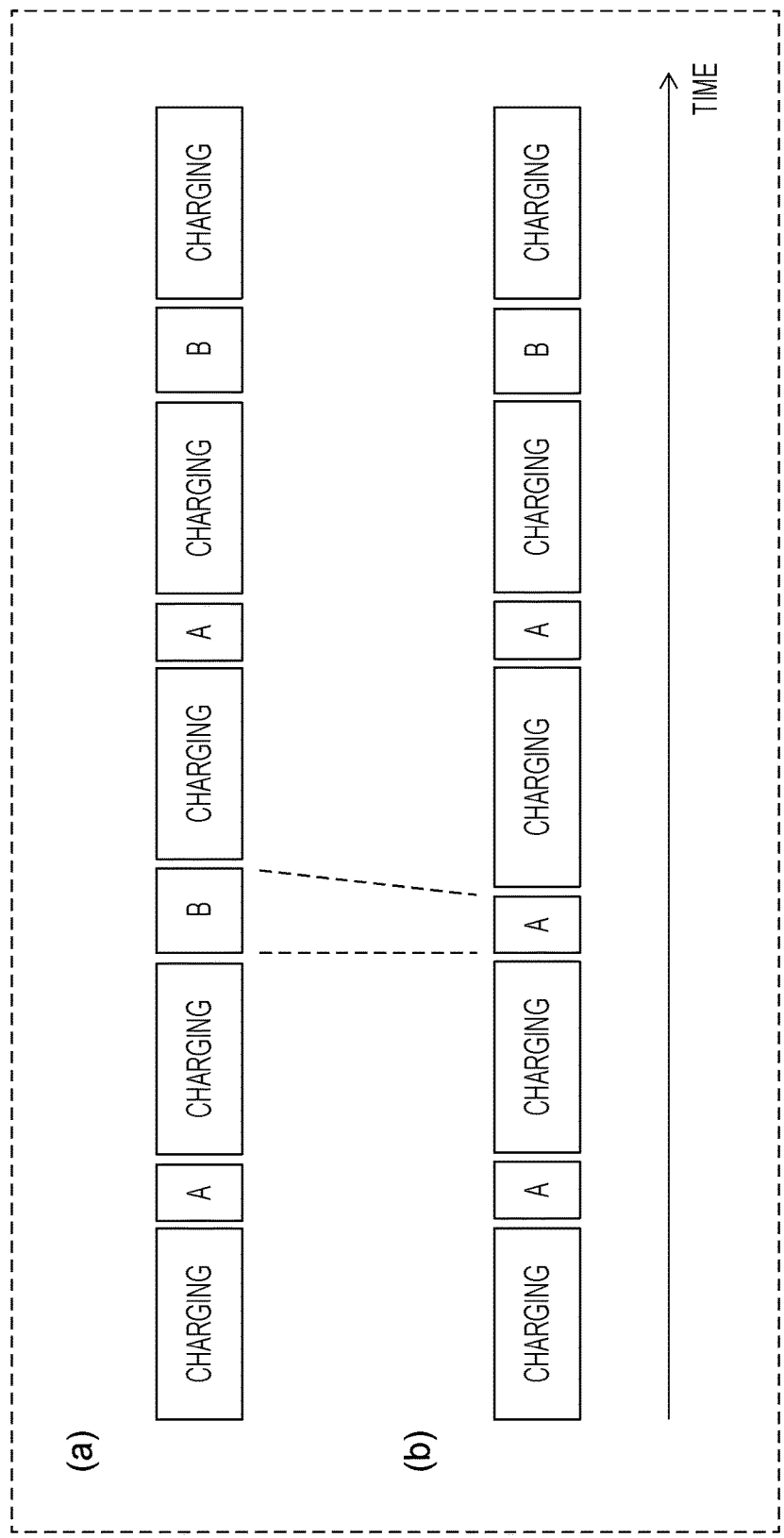
FIG. 23 is a diagram illustrating a fourth example of the process division in the embodiment 1.

FIG. 23(a) illustrates an example in which the process A and the process B are performed alternately. FIG. 23(b) illustrates a case in which the frequency of the process B whose processing time is longer is made lower and the frequency of the process A whose processing time is shorter is made higher. As illustrated in FIG. 23(b), the increased frequency of the process A whose processing time is shorter enables further reduction of the charging interruption time.

In this example, the measurement circuit 1006 stores measurement results in the memory 1093 after the measurement processes A, B. The judgment circuit 1007 calls the result of last measurement process B from the memory 1093 after the measurement process A, and performs a calculation process to judge on presence or absence of a foreign substance. After the measurement process B, the judgment circuit 1007 calls the result of the last measurement process A after the measurement process B, and performs a calculation process to judge presence or absence of a foreign substance.

With the above processing, the foreign substance sensing time with respect to entire charging time can be shortened. In addition, when a result different from that of the last measurement process A is obtained in a measurement process A, it is likely that a foreign substance has mixed into coils. Thus, even if a scheduled next process is A, the process B may be performed.

<Process Division Example 5: Omitting Calculation>

A fifth example of process division is described hereinafter. In this example, a foreign detection process is divided to a measurement process and a calculation process for every physical quantity to be measured. If a measurement result of a physical quantity is same as a result of last time, the foreign substance detection circuit 1004 omits the calculation process and makes same judgment as the last time.

Figure 24:
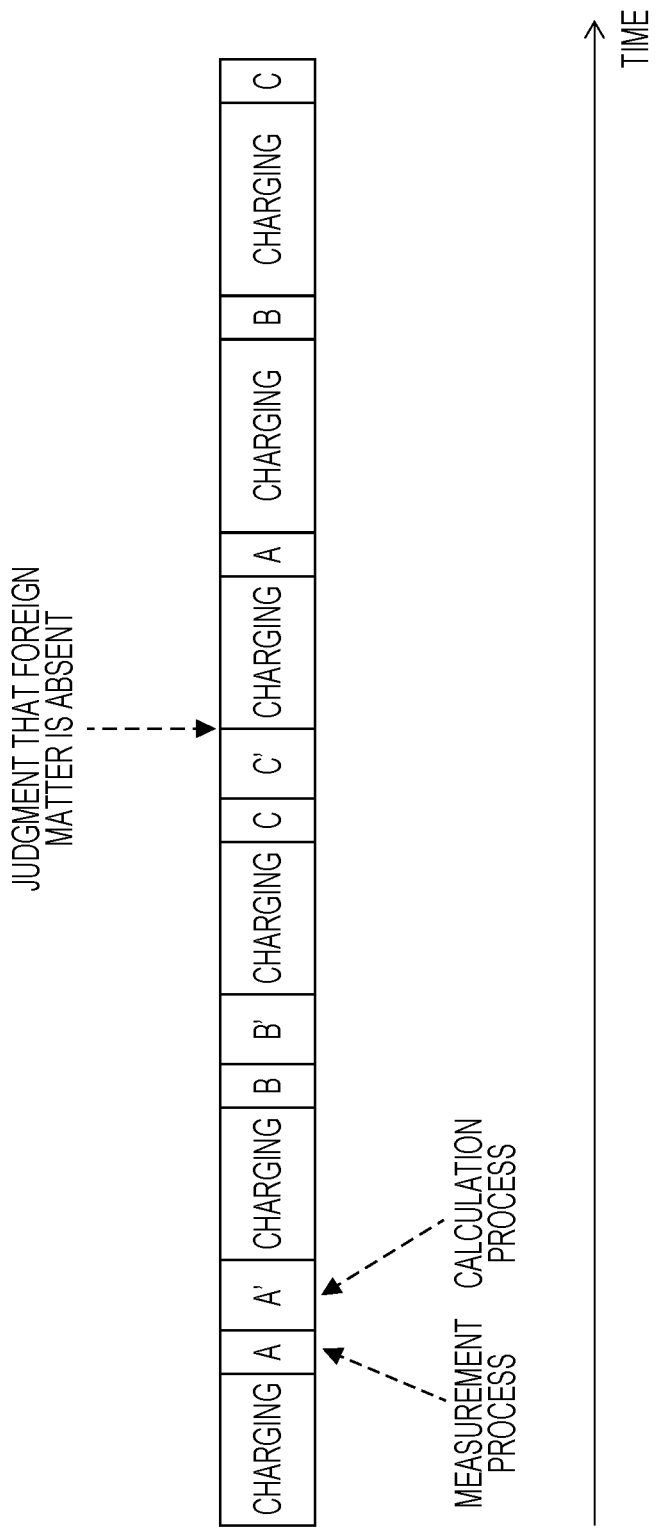
FIG. 24 is a diagram illustrating a fifth example of the process division in the embodiment 1.

FIG. 24 is a diagram illustrating a relation of processes related to a charging process and a process related to foreign substance detection in this example. In this example, a measurement process is divided to processes A, B, C, and a calculation process is divided to processes A', B', C'. After performing the processes A, A', B, B', C, C' in this order, the foreign substance detection circuit 1004 judges presence or absence of a foreign substance.

If it is finally judged that there is no foreign substance after the calculation process C', charging continues to be performed. When a result of the measurement process A in a next session does not substantially differ from the result of the last measurement process A, the foreign substance detection circuit 1004 does not perform the calculation process A' and immediately judges that there is no foreign substance. With this, the calculation process after the measurement process A can be omitted. Similarly, when a result of a measurement process B or C does not substantially differ from the result of the last measurement, the foreign substance detection circuit 1004 also judges that there is no foreign substance. The processing described above can shorten the interruption time during charging.

In this example, when each measurement process is complete, the measurement circuit 1006 stores a value thereof in the memory 1093. During a next measurement, the judgment circuit 1007 reads the measured value stored in the memory 1093 and compares both values. When the judgment circuit 1007 determines that a difference between both values does not substantially differ, it judges that there is no foreign substance.

Figure 25:
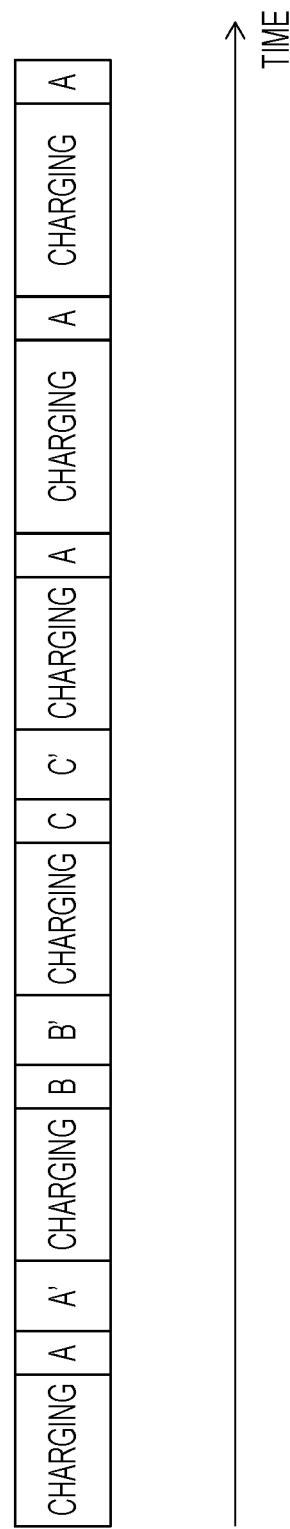
FIG. 25 is a diagram illustrating a variation of the fifth example of the process division in the embodiment 1.

As illustrated in FIG. 25, when there is no change in a measurement value in the process A, the process B and the process C may be omitted. In this case, only the process A is performed till any change occurs in measurement values in the processes A, the calculation process A' and other processes B, B', C, C' are performed when a change has occurred, and the judgment circuit 1007 may judge on presence or absence of a foreign substance.

<Process Division Example 6: Division of Sensing and Calculation>

A sixth example of process division is described hereinafter. In this example, a measurement process and a calculation process are separated and the calculation process is performed during a period of charging. The measurement process is a process to measure a physical quantity of a voltage, a frequency, input inductance or the like. The calculation process is a process to judge on presence or absence of a foreign substance by calculation based on a measured physical quantity.

Figure 26:
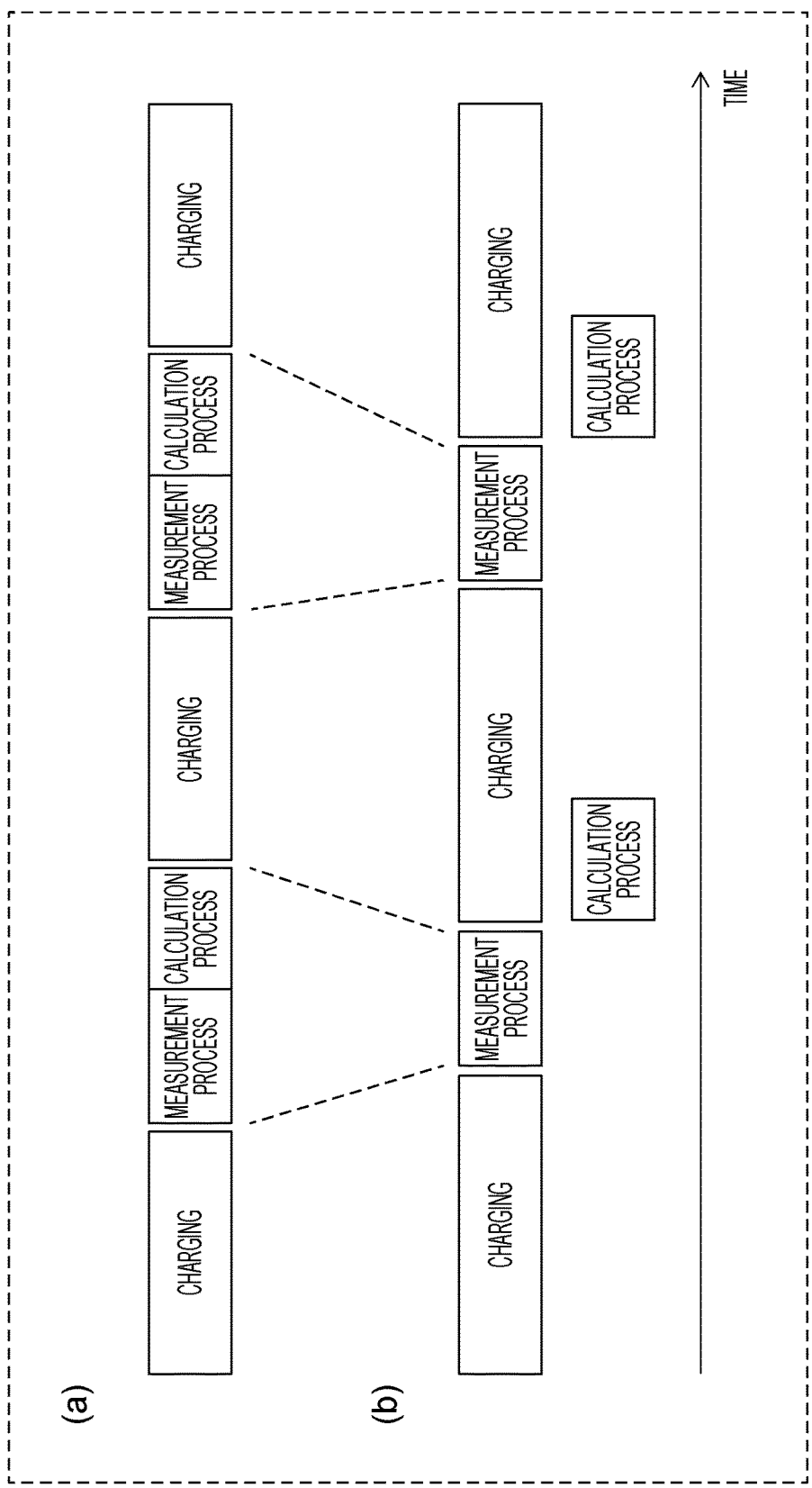
FIG. 26 is a diagram illustrating a sixth example of the process division in the embodiment 1.

FIG. 26(a) illustrates a case in which a measurement process and a calculation process are consecutively performed while charging is interrupted. FIG. 26(b) illustrates a case in which a calculation process is performed in a next period of charging. In this example, as illustrated in FIG. 26(b), since the calculation process is performed during charging, power transmission has only to be stopped only for time in which the measurement process is performed. Thus, one charging interruption time can be shortened. Consequently, a proportion of time in which charging is performed to the entire charging period increases.

As described above, the examples of process division in this embodiment have been described. However, a method for dividing a process is not limited thereto. For example, when a coupling coefficient k is not used, there is no need to divide a process to multiple frequencies and process them. This disclosure is not limited to any specific method, as far as a series of multiple processes included in a foreign substance detection process is divided among multiple foreign substance detection sessions when the foreign substance detection process is performed based on a physical quantity that varies depending on approach of a foreign substance to the power transmission resonator.

(Embodiment 2)

A second embodiment is described hereinafter. This embodiment differs from the embodiment 1 in that a detection resonator (third resonator) 1011 to detect a foreign substance and a power transmission resonator 1010a (second resonator) are a common resonator. Differences from the embodiment 1 are mainly described in the following.

Figure 27:
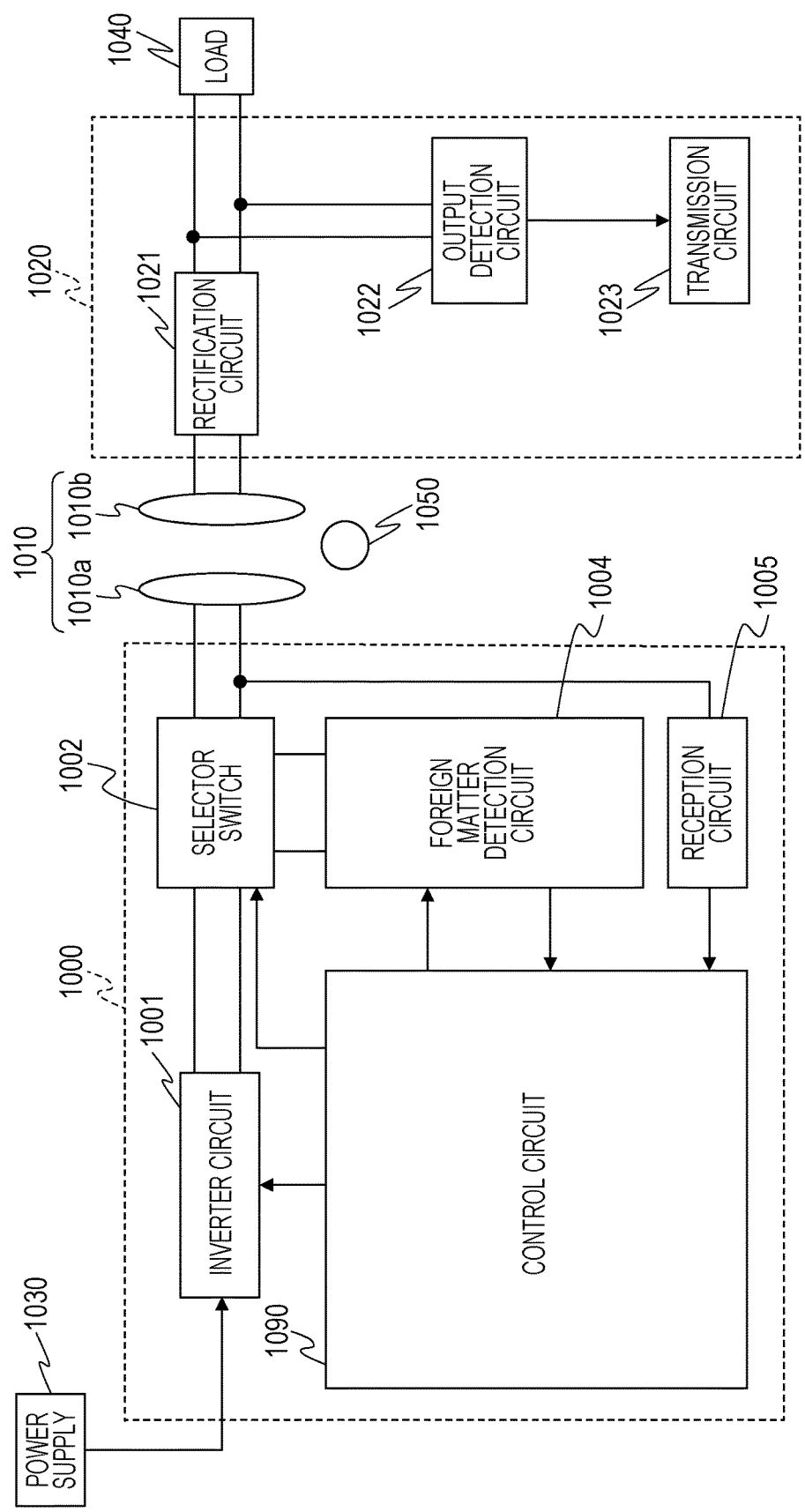
FIG. 27 is a diagram illustrating a configuration of a wireless power transmission system in an embodiment 2.
Figure 28:
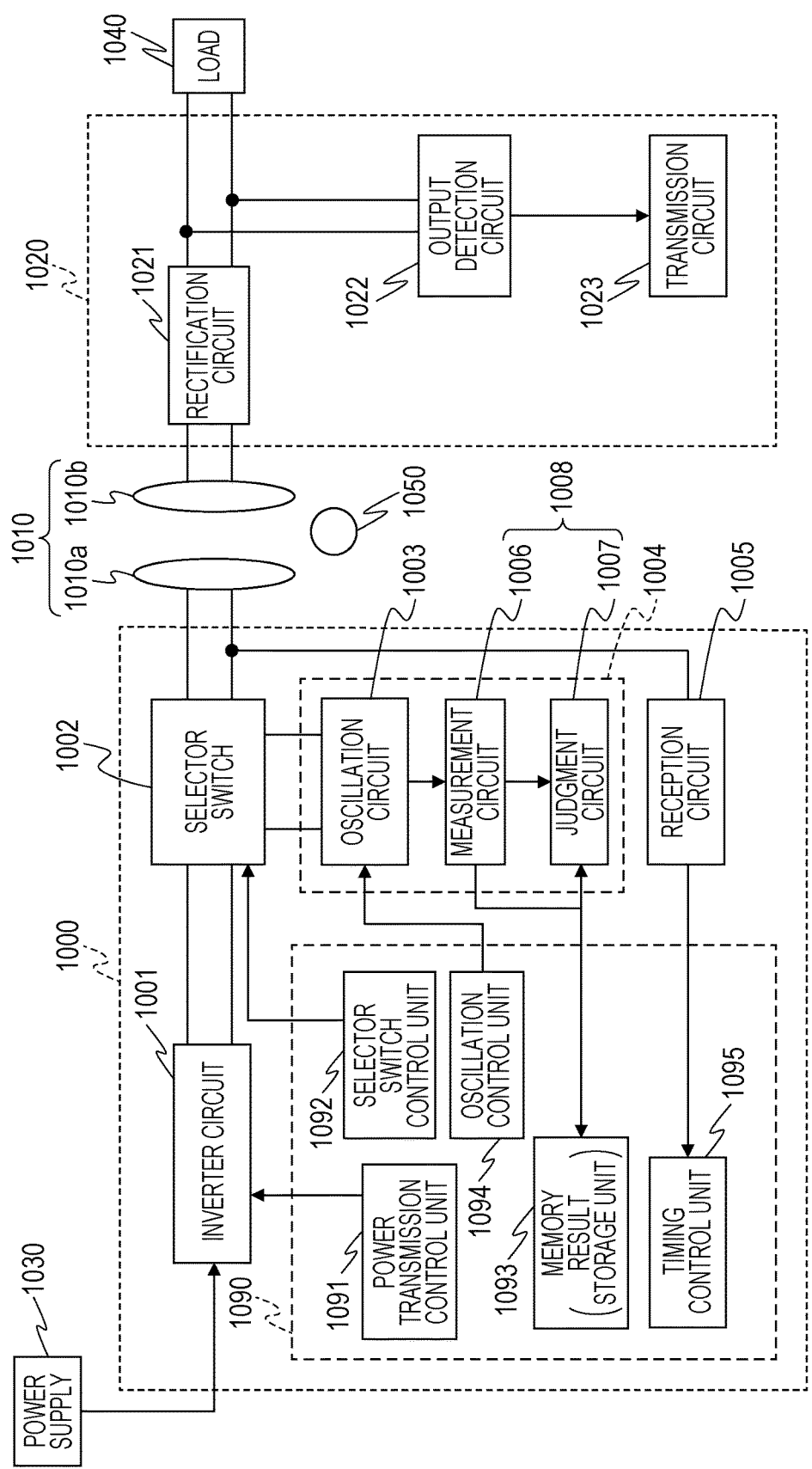
FIG. 28 is a diagram illustrating a detailed configuration of a power transmission circuit in the embodiment 2.

FIG. 27 is a diagram illustrating a schematic configuration of a wireless power transmission system in this embodiment. FIG. 28 is a diagram illustrating a detailed configuration of the control circuit 1090 and the foreign substance detection circuit 1004 in FIG. 27. In this wireless power transmission system, the power transmission resonator 1010a functions as the detection resonator 1011 for detecting a foreign substance 1050. A power transmission circuit 1000 further includes a selector switch 1002. The selector switch 1002 switches a circuit to be connected to the power transmission resonator 1010a.

Figure 29:
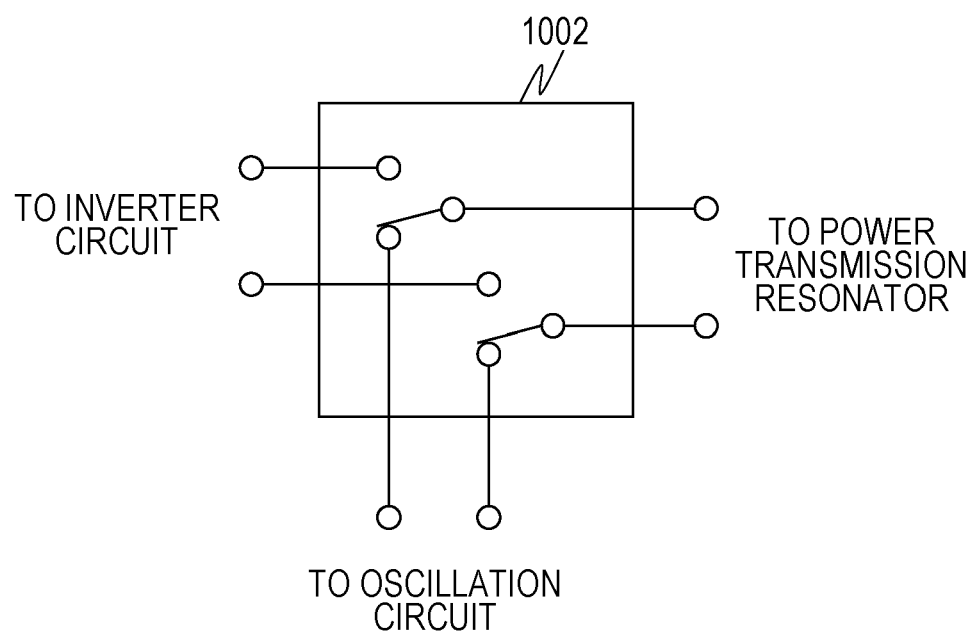
FIG. 29 is a diagram illustrating a configuration of a selector switch in the embodiment 2.

FIG. 29 is a diagram illustrating a configuration example of the selector switch 1002. The selector switch 1002 switches a state in which an inverter circuit 1001 and a power transmission resonator 1010a are conducting and a state in which an oscillation circuit 1003 and the power transmission resonator 1010a re conducting. This switching is performed by a selector switch control unit 1092 in the control circuit 1090.

In a power transmission session, the selector switch control unit 1092 electrically connects the inverter circuit 1001 with the power transmission resonator 1010a. In a foreign substance sensing session, the selector switch control unit 1092 electrically connects the oscillation circuit 1003 with the power transmission coil 1010a. This enables power transmission and foreign substance sensing to be performed alternately, similar to the embodiment 1.

Also in this embodiment, process division similar to the embodiment 1 can be applied. For example, a process in which a measurement circuit 1006 measures a physical quantity that varies depending on input impedance of the power transmission resonator 1010a as well as a computation process and a determination process performed by a judgment circuit 1007 can be divided into multiple steps and performed while power transmission is interrupted. Since dividing to multiple steps and performing the foreign substance detection process increases the frequency of foreign substance detection, thus improving safety.

(Examples)

Examples of this embodiment are described hereinafter. In this example, in the configuration described with reference to FIG. 14, the effect of foreign substance detection is verified using multiple evaluation circuits. In this example, similar to the embodiment 2, a configuration is adopted in which a power transmission resonator and a detection resonator are a common resonator.

Figure 30:
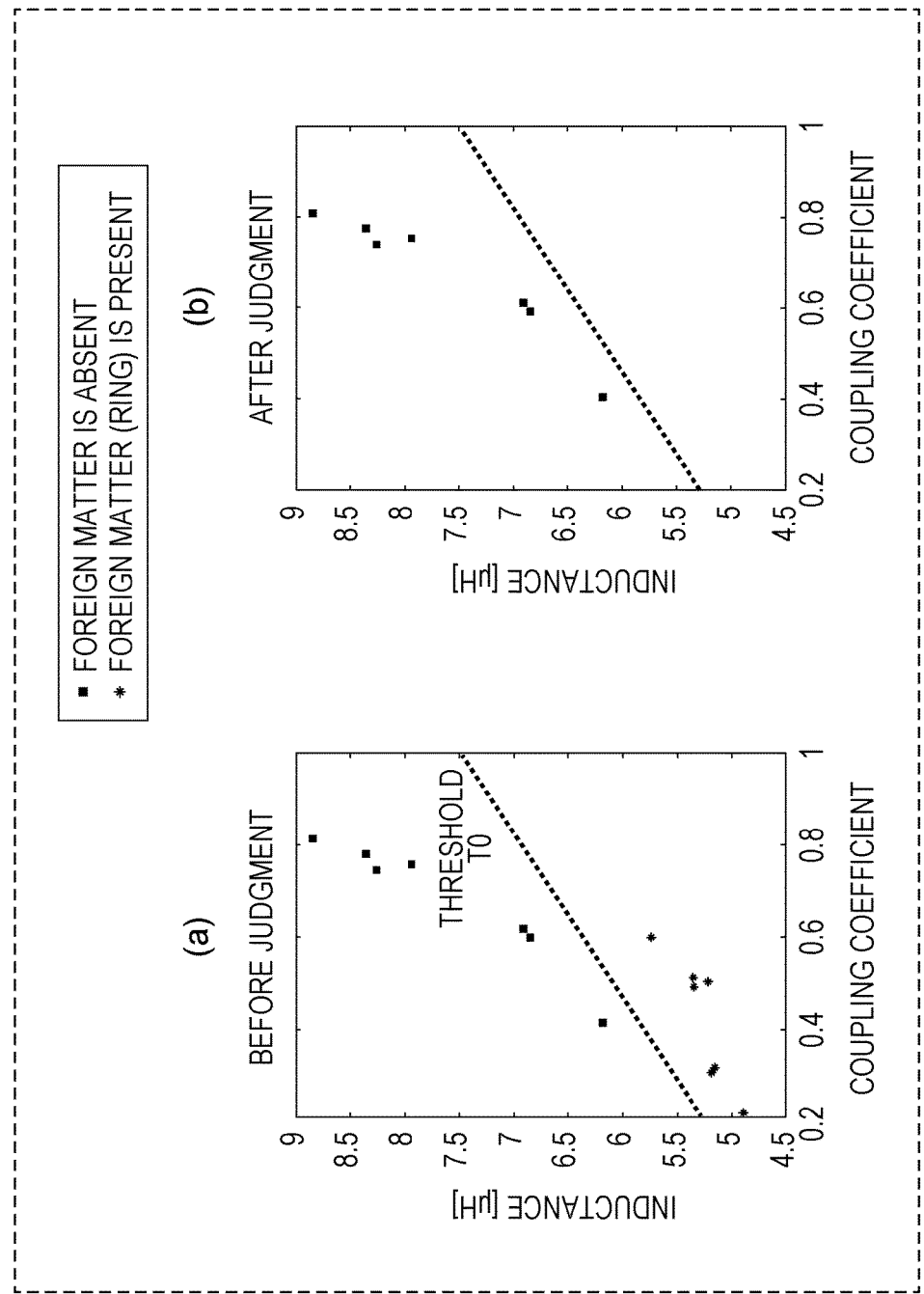
FIG. 30 is a first diagram showing a sensing result that determines presence or absence of a foreign substance, using the seven models of evaluation terminals.
Figure 31:
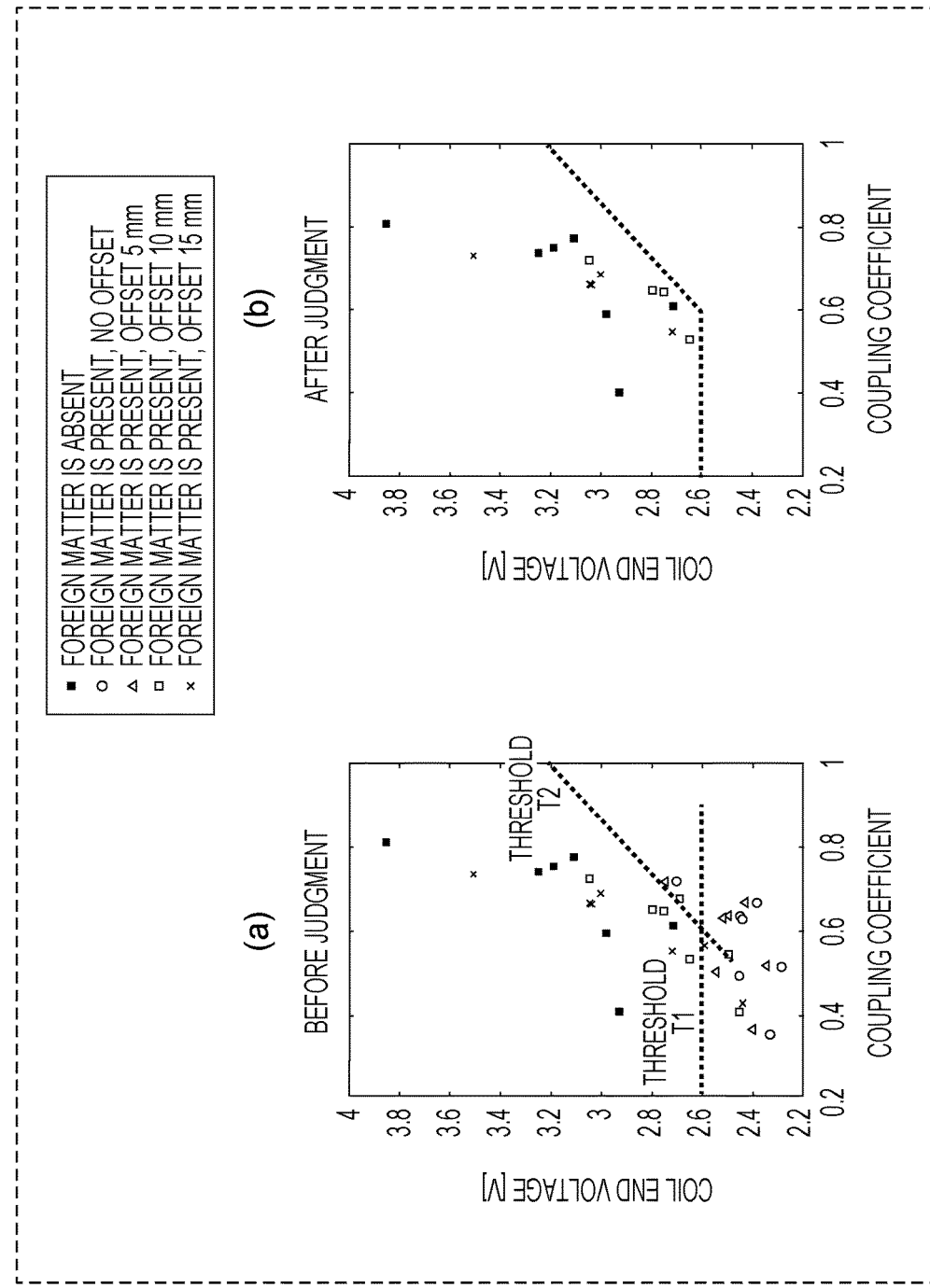
FIG. 31 is a second diagram showing a sensing result that determines presence or absence of a foreign substance, using the seven models of evaluation terminals.
Figure 32:
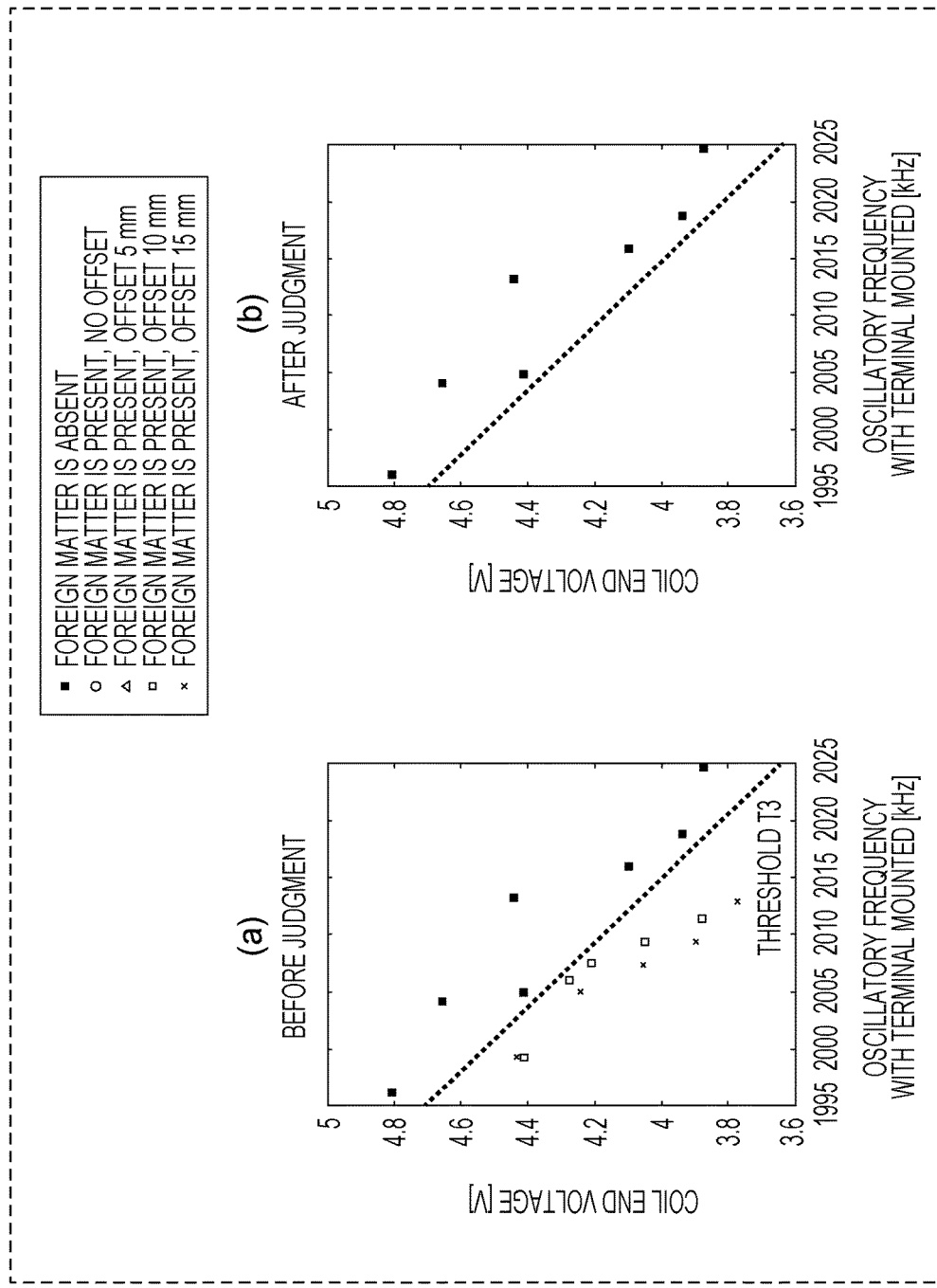
FIG. 32 is a third diagram showing a sensing result that determines presence or absence of a foreign substance, using the seven models of evaluation terminals.

FIG. 30 to FIG. 32 are diagrams illustrating detections result of determination made on presence or absence of a foreign substance by using seven models of evaluation terminals that includes a power reception coil ($\phi$22 mm to 40 mm) which is different from a power transmission coil ($\phi$40 mm). Here, a determination on presence or absence of a foreign substance is made based on a flowchart illustrated in FIG. 14. The power reception coils of the seven evaluation terminals are connected with a parallel condenser and a resonance frequency fr which is dictated by the power transmission coil and the parallel condenser is set to 1000 kHz. The oscillation circuit is a self-exciting pierce oscillation circuit capable of oscillating at a first frequency f1 which is lower than the resonance frequency fr and at a second frequency f2 which is higher than the resonance frequency fr. In this example, as an evaluation foreign substance, a metal ring ($\phi$22 mm) is selected as a foreign substance that shields the magnetic field and an iron disk ($\phi$15 mm) as a foreign substance that does not shield the magnetic field are selected.

First, judgment on a presence or absence of a metal ring is made according to Step 1 in FIG. 14. With reference to a measurement result in FIG. 30(a), it can be seen that inductance tends to decrease as a coupling coefficient becomes lower. It can also be seen that the inductance tends to further decrease if the metal ring is present between the power transmission coil and the power reception coil. Thus, an inductance threshold T0 is set in view of this difference. It is assumed that the threshold T0 is a function which takes the coupling coefficient as a variable, and that a foreign substance is present when the coupling coefficient is equal to or lower than T0. In FIG. 30(b), a case in which the inductance is equal to or lower than T0 is excluded. From a comparison of the cases before and after judgment in FIG. 30, it can be seen that the case in which the metal ring is present between the power transmission coil and the power reception coil is reliably excluded.

Then, judgment on presence or absence of an iron disk (in the vicinity of the center) is made according to Step 2 in FIG. 14. Evaluation is performed by setting an offset position of the iron disk from the center of the power transmission coil to the four types of 0 mm, 5 mm, 10 mm, and 15 mm, and setting a frequency to f1 (odd mode). With reference to a measurement result in FIG. 31(a), it can be seen that a voltage tends to decrease as a coupling coefficient becomes low. It can also be seen that a coil-end voltage tends to further decrease when an iron disk is present between the power transmission coil and the power reception coil. Thus, thresholds T1 and T2 of the coil-end voltage are set based on this difference. It is assumed that the thresholds T1, T2 are a function which takes a coupling coefficient as a variable and that a foreign substance is present when the coil-end voltage is equal to or lower than T1 or equal to or lower than T2. From a comparison of the cases before and after judgment in FIG. 31, it can be seen that the case in which the iron disk with an offset of 0 mm to 5 mm is present between the power transmission coil and the power reception coil is reliably excluded. Since this operation mode is the above-mentioned odd mode operation, magnetic flux in the vicinity of the coil is dense. Thus, the iron disk with the offset of 0 mm to 5 mm can be mainly detected.

Lastly, according to Step 3 in FIG. 14, judgment on presence or absence of an iron disk (peripheral area) is made. Evaluation is performed by setting an offset position of the iron disk from the center of the power transmission coil to the four types of 0 mm, 5 mm, 10 mm, and 15 mm, and setting a frequency to f2 (even mode). FIG. 32 shows a result thereof. However, the foreign substance that can be excluded in Step 2 is not shown. With reference to a measurement result of FIG. 32(a), it can be seen that the coil-end voltage tends to decrease as an oscillatory frequency increases, that is to say, inductance which is an inverse of a power thereof decreases. It can also be seen that the voltage tends to further decrease when the iron disk is present between the power transmission coil and the power reception coil. Thus, a threshold T3 of the coil-end voltage is set based on this difference. It is assumed that the threshold T3 is a function which takes the oscillatory frequency as a variable and that a foreign substance is present when the coil-end voltage is equal to or lower than T3. From a comparison of the cases before and that after judgment in FIG. 32, it can be seen that a case in which the iron disk with the offset of 10 mm to 15 mm is present between the power transmission coil and the power reception coil can be reliably excluded. Since this operation mode is the above-mentioned even mode operation, magnetic flux on an area from the inner diameter to the outer diameter of the coil is dense. Thus, the iron disk with the offset of 10 to 15 mm can be mainly detected.

By performing the procedure of Step 1 to Step 3 as described above, it can be confirmed that a foreign substance between coils can be reliably detected even for a combination of different power transmission coil and power reception coil. A measurement parameter (voltage, frequency, coupling coefficient) used in foreign substance judgment in this example is one example, and similar detection is also possible when other parameter is used. It is also possible to make judgment on presence or absence of a foreign substance based on input impedance of a detection resonator at a frequency f1 which is lower than the above-mentioned resonance frequency and at a frequency f2 which is higher than the resonance frequency, a secondary parameter that is calculated therefrom, or a third parameter that is calculated from a combination thereof. A selection of these parameters and thresholds may be appropriately changed depending on an intended application of a power transmission device and a power reception device including the foreign substance sensing judgment circuit in this disclosure.

In this example, while a description is given on the assumption that the three steps illustrated in FIG. 14 are performed consecutively, in practice, the timing control described in the embodiment 1 may be performed. For example, when the timing control illustrated in FIG. 24 is applied, the measurement process and the calculation (determination) process in Step 1 may be made A, A', the measurement process and the calculation process in Step 2 B, B', and the measurement process and the calculation process in Step 3 C, C'. The timing control is not limited to this, and the timing control described with reference to FIG. 19, FIG. 21, FIG. 22, FIG. 23, FIG. 25, and FIG. 26 may also be applied. Alternatively, a combination of more than one of the timing control may be used.

As described, this disclosure includes a power transmission device and a wireless power transmission system described in the following items.

[Item 1]

A power transmission device comprising:
an inverter that generates first AC power and transmits the first AC power wirelessly to a first resonator of a power receiving device via a second resonator;
an oscillator that generates second AC power which is smaller than the first AC, and transmits the second AC power to the first resonator via a third resonator;
a foreign substance detector that performs a series of multiple processes thereby to determine whether or not a foreign substance is present between the first resonator and the third resonator based on a physical quantity at the third resonator, the physical quantity varying depending on the second AC power; and
power transmission control circuitry operative to:
cause the foreign substance detector to perform the series of multiple processes before a start of a transmission of the first AC power;
cause the inverter to start the transmission of the first AC power if the foreign substance detector determines that the foreign substance is not present;
repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and
cause the foreign substance detector to divide the series of multiple processes and determine whether or not the foreign substance is present as a result of performing all of the divided series of multiple processes.

According to the aspect described above,
the power transmission control circuitry
causes the foreign substance detector to perform a series of multiple processes and determine whether or not a foreign substance is present before transmission of the first AC power starts, and then causes the inverter circuit to start power transmission of the first AC power;

after the transmission of the first AC power starts, repeats a foreign substance sensing session in which the foreign substance sensing is performed and a power transmission session in which power transmission of the first AC power is performed in such a way that the series of multiple processes is divided and performed in the repeated multiple foreign substance sensing sessions; and causes the foreign substance detector to determine whether or not a foreign substance is present by dividing and performing the series of multiple processes using the multiple foreign substance sensing sessions.

This can make length of the one foreign substance sensing session short (more specifically, power transmission stop time short) and reduce a proportion of power transmission time in which power is transmitted to time of foreign substance sensing. Thus, reduction of the power transmission efficiency can be prevented. This can also make the one foreign substance sensing session short (the power transmission stop period short). For example, this can make the power transmission stop period shorter than a delay period from when power transmission is stopped to when the power transmission stop is notified by means of a notification unit of a power reception device. Thus, a lamp indicating that charging is ongoing at the power reception device can be kept lighted.

Then, foreign substance sensing with high accuracy can be performed by causing the foreign substance detector to determine whether or not a foreign substance is present by performing all the divided processes in the series of multiple processes.

[Item 2]

The power transmission device of item 1, wherein a division session in which a divided process in the series of multiple processes is performed is shorter than a delay period from when power transmission is stopped to when the power reception device notifies the stop of the power transmission.

According to the aspect described above, the power transmission stop time during power transmission is stopped can be made shorter than length of the delay period till the stop of power transmission is notified by means of the notification unit of the power reception device. Thus, the notification unit (such as a lamp) indicating that charging is ongoing can be continuously kept.

[Item 3]

The power transmission device of item 1 or 2, wherein the series of multiple processes includes a determination process to determine that the foreign substance is present between the first resonator and the third resonator when a difference between the physical quantity after change and a predetermined reference value is larger than a preset threshold.

According to the aspect described above, the foreign substance sensing session can be made shorter since there is no process to determine whether or not the foreign substance is present based on a value computed from the measured physical quantity.

[Item 4]

The power transmission device of item 1 or 2, wherein the series of multiple processes includes:

a measurement process to measure the physical quantity at the third resonator which varies depending on the second AC power; and a determination process to determine whether or not the foreign substance is present, based on a value calculated from the measured physical quantity.

According to the aspect described above, division of the measurement process and the determination process can shorten power transmission stop period, in which power transmission is stopped, in the foreign substance sensing period and enables foreign substance sensing with high accuracy after power transmission starts while avoiding reduction of the power transmission efficiency.

[Item 5]

The power transmission device according to item 1 or 2, wherein the series of multiple processes includes:

two or more types of measurement processes to measure physical quantities at the third resonator which vary depending on the second AC power; and a determination process to determine whether or not the foreign substance is present, based on a value computed from the physical quantities measured at the two or more types of measurement processes.

According to the aspect described above, a foreign substance can be sensed with high accuracy.

[Item 6]

The power transmission device of item 5, wherein the two or more types of measurement processes includes a first type of measurement process in which the foreign substance detector measures the physical quantity when the oscillation circuit oscillates at a first frequency f1 which is lower than a resonance frequency fr of the third resonator, and a second type of measurement process in which the foreign substance detector measures the physical quantity when the oscillation circuit oscillates at a second frequency f2 which is higher than the resonance frequency fr of the third resonator.

According to the aspect described above, a foreign substance can be sensed with high accuracy.

[Item 7]

The power transmission device of item 1 or 2, wherein the series of multiple processes includes a first determination process to measure a first physical quantity corresponding to a first type of foreign substance and determine whether or not the first type of foreign substance is present and a second determination process to determine a second physical quantity corresponding to a second type of foreign substance and determine whether or not the second type of foreign substance is present, and the power transmission control circuitry causes the inverter circuit to transmit the first AC power between the first determination process and the second determination process.

According to the aspect described above, the first type of foreign substance and the second type of foreign substance can be sensed with high accuracy.

[Item 8]

The power transmission device of one of items 1 to 7, wherein the first resonator and the third resonator are a common resonator, the power transmission device including a switch that switches i) electric connection of the inverter circuit and the common resonator and ii) electric connection of the oscillation circuit and the common resonator, under control of the power transmission control circuitry, and when finishing a first process in the divided processes in the series of multiple processes and resuming power transmission of the first AC power, the power transmission control circuitry controls the switch and switches from the electric connection of the oscillation circuit and the common resonator to the electric connection of the inverter circuit and the common resonator, and when interrupting the power transmission of the first AC power and starting a second process following the first process, the power transmission control circuitry controls the switch and switches from the electric connection of the inverter circuit and the common resonator to the electric connection of the oscillation circuit and the common resonator.

According to the aspect described above, the number of components as well as cost can be reduced by causing the common resonator to act as the first resonator and the third resonator.

[Item 9]

The power transmission device of one of items 1 to 8, wherein a physical quantity at the third resonator is a voltage applied to the third resonator, a current flowing to the third resonator, a frequency of the voltage applied to the third resonator, an input impedance value of the third resonator, or an input inductance value of the third resonator.

According to the aspect described above, it can be easily determined whether or not a foreign substance is present between the first resonator and the third resonator, by measuring the physical quantity.

[Item 10]

The power transmission device of one of items 1 to 9, wherein the first resonator has a parallel resonance circuit including a coil and a capacitor, the physical quantity at the third resonator is an input inductance of the third resonator, and the foreign substance detector:

measures an input inductance value Lin(f1) of the third resonator when the oscillation circuit oscillates at the first frequency f1 in the first type of measurement process and an input inductance value Lin(f2) of the third resonator when the oscillation circuit oscillates at the second frequency f2 in the second type of measurement process, and calculates a coupling coefficient k in accordance with an expression of $k^2=1-Lin(f2)/Lin(f1)$ to determine based on the calculated coupling coefficient k whether or not a foreign substance is present, in the determination process.

According to the aspect described above, a coupling coefficient is calculated in accordance with an expression of $k^2=1-Lin(f2)/Lin(f1)$ and it is determined based on the calculation coupling coefficient k whether or not a foreign substance is present.

If an input inductance value of the third resonator when both ends of the coil are shorted is used for Lin(f2) and an input inductance value of the third resonator when both ends of the coil are open is used for Lin(f1), a coupling coefficient k of high accuracy can be calculated and it can be determined with high accuracy whether or not a foreign substance is present.

A parallel resonance circuit including the coil and a capacitor provided at both ends of the coil is provided in the power reception device. With this, a state in which both ends of the coil are substantially open can be created since no electric current flows to the capacitor when the oscillation circuit is driven at the frequency f1 which is lower than the second resonance frequency f2. In addition, a state in which both ends of the coil are shorted can be created since the electric current flows to the capacitor when the oscillation circuit is driven at the frequency f2 which is higher than the second resonance frequency fr.

Thus, only provision of a capacitor at both ends of the coil makes it possible to create the state in which both ends of the coil are substantially open and the state in which both ends of the coil are shorted. Accordingly, unlike usual practice, there is no need to provide a shorting switch at both ends of the coil and provide in the power reception device a control circuit that controls the provided shorting switch. Thus, the burden of sending a signal from the power transmission device to control the shorting switch, which has been usually performed, can be removed. Consequently, since foreign substance sensing is performed with the coupling coefficient of high accuracy, foreign substance sensing can be performed with high prevision without resulting in increased cost, even when the load fluctuates in simple configuration.

[Item 11]

The power transmission device of one of items 1 to 10, wherein the first resonator has a parallel resonance circuit including a coil and a capacitor, the physical quantity at the third resonator is an input inductance of the third resonator; and the foreign substance detector:

measures an input inductance value Lin(f1) of the third resonator when the oscillation circuit oscillates at the first frequency f1 in the first type of measurement process and an input inductance value Lin(f2) of the third resonator when the oscillation circuit oscillates at the second frequency f2 in the second type of measurement process, and calculates a ratio of the Lin(f1) to the Lin(f2) to determine based on the calculated ratio whether or not a foreign substance is present, in the determination process.

What is meant by "based on a ratio of the input inductance value Lin(f1) to the input inductance value Lin(f2)" is described hereinafter.

The expression 1 to calculate the coupling coefficient k of $[k^2=1-Lin(f2)/Lin(f1)]$ can be transformed to an expression 2 $[Lin(f2)/Lin(f1)=1-k^2]$. Thus, when Lin(f2)/Lin(f1) is determined, a coupling coefficient k can be uniquely determined. Therefore, it can be determined based on a ratio of the input inductance value Lin(f1) to the input inductance value Lin(f2) whether or not a foreign substance is present between the first resonator and the third resonator.

According to the aspect described above, in order to calculate a coupling coefficient k with the expression 1, a calculation process of a square root other than the four arithmetic operations is requested. On the other hand, since a ratio of the input inductance value Lin(f1) to the input inductance value Lin(f2) is a simple division, load of processing can be alleviated and computation speed can be accelerated.

In addition, similar to the aspect described above, there is no need to provide a shorting switch at both ends of the coil, and thus the burden of sending a signal from the power transmission device to control the shorting switch can be removed.

[Item 12]

The power transmission device of one of items 1 to 11, wherein
the first resonator has a parallel resonance circuit including a coil and a capacitor,
the oscillation circuit is a self-exciting circuit,
the physical quantity at the third resonator is a frequency of a voltage applied to the third resonator,
a square of an oscillatory frequency of the oscillation circuit is inversely proportional to an input inductance value of the third resonator, and
the foreign substance detector:
measures a frequency f1 of the third resonator when the oscillation circuit oscillates in the first type of measurement process and measures a frequency f2 of the third resonator when the oscillation circuit oscillates in the second type of measurement process, and
calculates a coupling coefficient k in accordance with an expression of $k^2=1-f1^2/f2^2$ to determine based on the calculated coupling coefficient k whether or not the foreign substance is present, in the determination process.

According to the aspect described above,
when the oscillation circuit is a self-exciting circuit, and if it is assumed that the input inductance value is L and the capacitor is C, the frequency can be represented by the expression of $f=1/(2\pi\times(LC)^{(1/2)})$. Since capacity C is a circuit constant and known, and the input inductance value L is inversely proportional of the square of the frequency of the oscillation circuit, the expression for the coupling coefficient, $k^2=1-Lin(f2)/Lin(f1)$ can be replaced by the expression of $k^2=1-f1^2/f2^2$. With this, a step of measuring the input inductance with the measurement circuit is eliminated and vales of frequencies f1 and f2 oscillated by the oscillation circuit may be used. Thus, since there is no need of measuring the input inductance with the measurement circuit, the coupling coefficient can be calculated with high accuracy. Note that for values of the frequency f1 and the frequency f2, the measurement circuit may measure the frequency f1 and the frequency f2 of the first resonator. In addition, a similar idea may also be applied to other oscillation circuits and can be easily analogized by those skilled in the art.

Similar to the aspect described above, there is no need to provide a shorting switch at both ends of the coil, and thus the burden of sending a signal from the power transmission device to control the shorting switch can be removed.

[Item 13]

A wireless power transmission system, comprising:
a power reception device that includes
a first resonator,
a power receiving circuit that converts the first AC received by the first resonator to first DC power and
a load that supplied the first DC power from the power receiving circuit; and
a power transmission device, that includes
an oscillator that generates second AC power which is smaller than the first AC, and transmits the second AC power to the first resonator via a third resonator,
a foreign substance detector that performs a series of multiple processes thereby to determine whether or not a foreign substance is present between the first resonator and the third resonator based on a physical quantity at the third resonator, the physical quantity varying depending on the second AC power and
power transmission control circuitry operative to:
cause the foreign substance detector to perform the series of multiple processes before a start of a transmission of the first AC power;
cause the inverter to start the transmission of the first AC power if the foreign substance detector determines that the foreign substance is not present;
repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and
cause the foreign substance detector to divide the series of multiple processes and determine whether or not the foreign substance is present as a result of performing all of the divided series of multiple processes.

[Item 14]

A foreign substance detecting method using a power transmission device, the power transmission device including:
an inverter that generates first AC power and transmits the first AC power wirelessly to a first resonator of a power receiving device via a second resonator;
an oscillator that generates second AC power which is smaller than the first AC, and transmits the second AC power to the first resonator via a third resonator;
a foreign substance detector that performs a series of multiple processes thereby to determine whether or not a foreign substance is present between the first resonator and the third resonator based on a physical quantity at the third resonator, the physical quantity varying depending on the second AC power; and
a power transmission control circuitry that controls the power transmission device,
the method comprising causing the power transmission control circuitry to:
cause the foreign substance detector to perform the series of multiple processes before a start of a transmission of the first AC power;
cause the inverter to start the transmission of the first AC power if the foreign substance detector determines that the foreign substance is not present;
repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and
cause the foreign substance detector to divide the series of multiple processes and determine whether or not the foreign substance is present as a result of performing all of the divided series of multiple processes.

According to the aspect described above,
the power transmission control circuitry is caused to:
cause the foreign substance detector to perform a series of multiple processes to determine whether or not a foreign substance is present before a transmission of the first AC power starts and then cause the inverter circuit to start the power transmission of the first AC power,
repeat a foreign substance sensing session in which foreign substance sensing is performed and a power transmission session in which the power transmission of the first AC is performed after the he power transmission of the first AC power starts, the series of multiple processes being divided and performed in the repeated multiple foreign substance sensing sessions; and cause the foreign substance detector to divide and perform the series of multiple processes using the multiple foreign substance sensing sessions them, and determine whether or not a foreign substance is present.

This can make length of the one foreign substance sensing session short (more specifically, power transmission stop time short) and reduce a proportion of power transmission time in which power is transmitted to time of foreign substance sensing. Thus, reduction of the power transmission efficiency can be prevented. This can also make the one foreign substance sensing session short (the power transmission stop period short). For example, this can make the power transmission stop period shorter than a delay period from when power transmission is stopped to when the power transmission stop is notified by means of a notification unit of a power reception device. Thus, a lamp indicating that charging is ongoing at the power reception device can be kept lighted.

Then, foreign substance sensing with high accuracy can be performed by causing the foreign substance detector to determine whetheror not a foreign substance is present by performing all the processes divided in the series of multiple processes.

[Item 15]

A power transmission device comprising:

an inverter that generates first AC power and transmits the first AC power wirelessly to a first resonator of a power receiving device via a second resonator;

an oscillator that generates second AC power which is smaller than the first AC, and transmits the second AC power to the first resonator via a third resonator;

a foreign substance detector that performs a series of multiple processes thereby to determine whether or not a foreign substance is present between the first resonator and the third resonator based on a physical quantity at the third resonator, the physical quantity varying depending on the second AC power; and power transmission control circuitry operative to:

cause the foreign substance detector to perform the series of multiple processes before a start of a transmission of the first AC power;

cause the inverter to start the transmission of the first AC power if the foreign substance detector determines that the foreign substance is not present;

repeat a foreign substance detection period and a power transmission period alternately where the foreign substance detection period is a period in which the foreign substance detector performs one of the series of multiple processes and the power transmission period is a period in which the inverter transmits the first AC power, after the start of the transmission of the first AC power; and cause the foreign substance detector to divide measurements of the physical quantity including the series of multiple processes and perform the divided measurement in one of the repeated foreign substance detection periods;

cause the foreign substance detector to divide the rest of the processes other than the measurements of the physical quantity including the series of multiple processes and perform the divided rest of process in parallel with one of the repeated power transmission periods, determine whether or not the foreign substance is present as a result of performing all of the divided series of multiple processes.

According to the aspect described above, the power transmission control circuitry:

causes the foreign substance detector to perform a series of multiple processes from measurement of the physical quantity to determination on the foreign substance, before transmission of the first AC power starts and determine whether or not a foreign substance is present, and then causes the inverter circuit to start power transmission of the first AC power;

after the power transmission of the first AC power starts, repeats a power transmission session in which the foreign substance sensing is performed and a power transmission session in which transmission of the first AC power is performed, in such a way that the measurement of the physical quantity included in the series of the multiple processes are divided and performed in the repeated multiple foreign substance sensing sessions, while the rest of the series of multiple processes other than the measurement of the physical quantity is divided and performed in the repeated multiple power transmission sessions, and causes the foreign substance detector to determine whether or not a foreign substance is present by dividing and performing the measurement of the physical quantity using the multiple foreign substance sensing sessions, and performing the rest of the processes other than the measurement of the physical quantity in parallel with the power transmission sessions.

According to the aspect described above, power transmission stop time can be further shortened and reduction of the power transmission efficiency can be prevented.

[Item 16]

A wireless power transmission system including:

a power transmission circuit that is configured to convert inputted direct current energy into AC energy and output it;

a power transmission resonator that is configured to send out the AC energy outputted from the power transmission circuit;

a power reception resonator that is configured to receive at least some of the AC energy sent out by the power transmission resonator; and a power reception circuit that is configured to convert the AC energy received by the power reception resonator to direct current energy and supply the direct current power to a load, wherein the power transmission circuit has:

an inverter circuit that is configured to convert the direct current energy into the AC energy and output it;

a foreign substance detection circuit that is configured to detect a foreign substance in the vicinity of the power transmission resonator by performing a foreign substance detection process including multiple steps; and a control circuit that controls the inverter circuit and the foreign substance detection circuit so as to alternately repeat a power transmission process using the inverter circuit and a process using the foreign substance sensing circuit, and wherein the foreign substance detection circuit is configured to perform different steps included in the multiple steps before and after one power transmission process.

[Item 17]

The wireless power transmission system of item 16, wherein the multiple steps include a step of measuring at least one physical quantity that changes as the foreign substance approaches and a step of judging based on a change amount from a reference value of the at least one physical quantity.

[Item 18]

The wireless power transmission system of item 17, wherein the multiple steps include a step of measuring a first physical quantity corresponding to a first type of foreign substance and a step of measuring a second physical quantity corresponding to a second type of foreign substance.

[Item 19]

The wireless power transmission system of one of items 16 to 18, wherein
the foreign substance detection circuit has:
an oscillation circuit that is electrically connected to the first resonator or other resonator for foreign substance detection and can oscillate at a first frequency f1 which is lower than a resonance frequency fr of the power reception resonator and at a second frequency f2 which is higher than the resonance frequency fr;
a measurement circuit that is configured to measure a physical quantity which varies depending on input impedance of the first resonator electrically connected to the oscillation circuit or the other resonator; and
a judgment circuit that is configured to judge on presence or absence of a foreign substance in the vicinity of a power transmission resonator, based on a change in the physical quantity measured by the measurement circuit when the oscillation circuit oscillates at the first frequency f1 and a change in the physical quantity measured by the measurement circuit when the oscillation circuit oscillates at the second frequency f2.

[Item 20]

The wireless power transmission system of item 19, wherein
the multiple steps include a first step of measuring the physical quantity by the measurement circuit when the oscillation circuit oscillates at the first frequency f1 and a second step of measuring the physical quantity by the measurement circuit when the oscillation circuit oscillates at the second frequency f2, and
the measurement circuit is configured to perform the first and second steps before and after one power transmission process.

[Item 21]

The wireless power transmission system of one of items 16 to 20, wherein
the multiple steps include two steps of measuring a same physical quantity and a step of judging on presence or absence of a foreign substance through calculation based on the physical quantity measured in the two steps, and
the foreign substance detection circuit is configured to perform each of the two steps before and after the one power transmission process.

[Item 22]

The wireless power transmission system of one of items 16 to 21, wherein the foreign substance detection circuit is configured to change frequency of performing each step depending on time taken for each of the multiple steps.

[Item 23]

The wireless power transmission system of one of items 16 to 21, wherein
the power reception circuit has a transmission circuit that is configured to transmit a communication packet for feedback notifying output variations in the power reception circuit,
the power transmission circuit has a reception circuit that is configured to receive the communication packet, and
the control circuit is configured to control the foreign substance detection circuit such that a process using the foreign substance detection circuit is not performed in a session in which the reception circuit is receiving the communication packet.

[Item 24]

The wireless power transmission system of one of items 16 to 23, wherein the foreign substance detection circuit is configured to perform two different measurement processes before and after the one power transmission process and perform a process to judge on presence or absence of a foreign substance through calculation based on results of the two measurement processes.

[Item 25]

The wireless power transmission system of item 24, wherein the foreign substance detection circuit is configured to perform the calculation based on the results of the two measurement processes during a power transmission session following the two measurement processes.

[Item 26]

The wireless power transmission system of one of items 16 to 25, wherein
the foreign substance detection circuit is configured to:
measure physical quantity that changes as the foreign substance approaches;
judge on presence or absence of the foreign substance by performing the calculation based on the physical quantity;
omit the calculation based on the physical quantity and judge that the foreign substance is not present when a same measurement result as the last time is obtained in a foreign substance sensing process following judgment that the foreign substance is not present.

[Item 27]

A power transmission device, including:
a power transmission circuit that is configured to convert inputted direct current energy into AC energy and output the AC energy; and
a power transmission resonator that is configured to send out the AC energy outputted from the power transmission circuit,
wherein the power transmission circuit has:
an inverter circuit that is configured to convert the direct current energy into the AC energy and output the AC energy;
a foreign substance detection circuit that is configured to detect a foreign substance in the vicinity of the power transmission resonator by performing a foreign substance detection process including multiple steps; and
a control circuit that controls the inverter circuit and the foreign substance detection circuit such that the power transmission process using the inverter circuit and a process using the foreign substance detection circuit are alternately repeated, and
the foreign substance detection circuit is configured to perform different steps included in the multiple steps before and after one power transmission process.

[Item 28]

A program to be executed by a computer mounted in a power transmission device including a power transmission circuit that is configured to convert inputted direct current energy into AC energy and output the AC energy and a power transmission resonator that is configured to send out the AC energy outputted from the power transmission circuit, the program causes the computer to:

perform a foreign substance detection process including multiple steps to detect a foreign substance in the vicinity of the power transmission resonator;
alternately perform a power transmission process using an inverter circuit and some steps of the multiple steps in the foreign substance detection process; and
perform different steps included in the multiple steps before and after one power transmission process.

The techniques in the present disclosure can be utilized in a charging system that performs charging of an electronic device such as a smart phone, a tablet terminal, a mobile terminal or in a motor-driven machine such as an electric vehicle. According to the embodiments of the present disclosure, the risk of abnormal heat generation of a foreign substance which is present between a power transmission coil and a power reception coil can be avoided.

What is claimed is:

1. A power transmission device comprising:
an inverter that generates first AC power and transmits the first AC power wirelessly to a first resonator of a power receiving device via a second resonator;
an oscillator that generates second AC power which is smaller than the first AC power, and transmits the second AC power to the first resonator via a third resonator;
a foreign substance detector circuit that performs a series of multiple processes to determine whether or not a foreign substance is present between the first resonator and the third resonator based on a physical quantity at the third resonator, the physical quantity varying depending on the second AC power; and
power transmission control circuitry operative to:
cause the foreign substance detector circuit to perform the series of multiple processes before a start of a transmission of the first AC power;
cause the inverter to start the transmission of the first AC power if the foreign substance detector circuit determines that the foreign substance is not present;
repeat a foreign substance detection period and a power transmission period alternately where the foreign substance detection period is a period in which the foreign substance detector circuit performs one of the series of multiple processes and the power transmission period is a period in which the inverter transmits the first AC power, after the start of the transmission of the first AC power; and
cause the foreign substance detector circuit to divide the series of multiple processes and determine whether or not the foreign substance is present as a result of performing all of the divided series of multiple processes,
wherein
the series of multiple processes includes:
two or more types of measurement processes to measure physical quantities at the third resonator which vary depending on the second AC power; and
a determination process to determine whether or not the foreign substance is present, based on a value computed from the physical quantities measured at the two or more types of measurement processes, and
the two or more types of measurement processes includes
a first type of measurement process in which the foreign substance detector circuit measures the physical quantity when the oscillator oscillates at a first frequency f1 which is lower than a resonance frequency fr of the third resonator, and a second type of measurement process in which the foreign substance detector circuit measures the physical quantity when the oscillator oscillates at a second frequency f2 which is higher than the resonance frequency fr of the third resonator.

2. The power transmission device of claim 1, wherein
the first resonator has a parallel resonance circuit including a coil and a capacitor,
the physical quantity at the third resonator is an input inductance of the third resonator, and
the foreign substance detector circuit:
measures an input inductance value Lin(f1) of the third resonator when the oscillator oscillates at the first frequency f1 in the first type of measurement process and an input inductance value Lin(f2) of the third resonator when the oscillator oscillates at the second frequency f2 in the second type of measurement process, and
calculates a coupling coefficient k in accordance with an expression of $k^2=1-Lin(f2)/Lin(f1)$ to determine based on the computed coupling coefficient k whether or not a foreign substance is present, in the determination process.

3. The power transmission device of claim 1, wherein
the first resonator has a parallel resonance circuit including a coil and a capacitor,
the physical quantity at the third resonator is an input inductance of the third resonator; and
the foreign substance detector circuit:
measures an input inductance value Lin(f1) of the third resonator when the oscillator oscillates at the first frequency f1 in the first type of measurement process and an input inductance value Lin(f2) of the third resonator when the oscillator oscillates at the second frequency f2 in the second type of measurement process, and
calculates a ratio of the Lin(f1) to the Lin(f2) to determine based on the calculated ratio whether or not the foreign substance is present, in the determination process.

4. The power transmission device of claim 1, wherein
the first resonator has a parallel resonance circuit including a coil and a capacitor,
the oscillator is a self-exciting circuit,
the physical quantity at the third resonator is a frequency of a voltage applied to the third resonator,
a square of an oscillatory frequency of the oscillator is inversely proportional to an input inductance value of the third resonator, and
the foreign substance detector circuit:
measures a frequency f1 of the third resonator when the oscillator oscillates in the first type of measurement process and measures a frequency f2 of the third resonator when the oscillator oscillates in the second type of measurement process, and
calculates a coupling coefficient k in accordance with an expression of $k^2=1-f1^2/f2^2$ to determine based on the calculated coupling coefficient k whether or not the foreign substance is present, in the determination process.

5. A power transmission device comprising:
an inverter that generates first AC power and transmits the first AC power wirelessly to a first resonator of a power receiving device via a second resonator;
an oscillator that generates second AC power which is smaller than the first AC power, and transmits the second AC power to the first resonator via a third resonator;
a foreign substance detector circuit that performs a series of multiple processes to determine whether or not a foreign substance is present between the first resonator and the third resonator based on a physical quantity at the third resonator, the physical quantity varying depending on the second AC power; and power transmission control circuitry operative to:
cause the foreign substance detector circuit to perform the series of multiple processes before a start of a transmission of the first AC power;
cause the inverter to start the transmission of the first AC power if the foreign substance detector circuit determines that the foreign substance is not present;
repeat a foreign substance detection period and a power transmission period alternately where the foreign substance detection period is a period in which the foreign substance detector circuit performs one of the series of multiple processes and the power transmission period is a period in which the inverter transmits the first AC power, after the start of the transmission of the first AC power; and
cause the foreign substance detector circuit to divide the series of multiple processes and determine whether or not the foreign substance is present as a result of performing all of the divided series of multiple processes, wherein the series of multiple processes includes a first determination process to measure a first physical quantity corresponding to a first type of foreign substance and determine whether or not the first type of foreign substance is present, and a second determination process to determine a second physical quantity corresponding to a second type of foreign substance and determine whether or not the second type of foreign substance is present, and the power transmission control circuitry causes the inverter to transmit the first AC power between the first determination process and the second determination process.

* * * * *